US012801829B2

(12) United States Patent
Hunter et al.

(10) Patent No.: US 12,801,829 B2
(45) Date of Patent: Nov. 17, 2026

(54) COMPUTER-IMPLEMENTED METHOD AND SYSTEM FOR CONTENT COMPLIANCE CHECKS BASED ON TIMING, SIZING, AND LOCATION ANALYSIS OF INDIVIDUAL COMPONENTS OF MEDIA CONTENT CORRELATED ACROSS THE INDIVIDUAL COMPONENTS

(71) Applicant: PUREINTEGRATION, LLC, Reston, VA (US)

(72) Inventors: Nick Hunter, Sterling, VA (US); Akash P. Patel, Vienna, VA (US)

(73) Assignee: PUREINTEGRATION, LLC

( * ) Notice: Subject to any disclaimer, the term of this patent is extended or adjusted under 35 U.S.C. 154(b) by 270 days.

(21) Appl. No.: 18/636,228

(22) Filed: Apr. 15, 2024

(65) Prior Publication Data

US 2025/0322143 A1 Oct. 16, 2025

(51) Int. Cl.

| | |
|---|---|
| ***G06F 40/109*** | (2020.01) |
| ***G06F 40/166*** | (2020.01) |
| ***G10L 15/26*** | (2006.01) |
| ***H04N 21/845*** | (2011.01) |

(52) U.S. Cl.

CPC .......... *G06F 40/109* (2020.01); *G06F 40/166* (2020.01); *G10L 15/26* (2013.01); *H04N 21/8456* (2013.01)

(58) Field of Classification Search

CPC ..................................................... G06F 40/109

See application file for complete search history.

(56) References Cited

U.S. PATENT DOCUMENTS

2012/0254917 A1* 10/2012 Burkitt et al. ....... H04N 21/458
2024/0386185 A1* 11/2024 Munoz et al. ........ G06F 30/106
2025/0008188 A1* 1/2025 Maoty et al. ...... H04N 21/4668
2026/0024034 A1* 1/2026 Baranwal et al. .......................... G06Q 10/06312
2026/0099866 A1* 4/2026 Brown et al. ...... G06Q 30/0277

* cited by examiner

*Primary Examiner* — James J Debrow
(74) *Attorney, Agent, or Firm* — Conley Rose, P.C.

(57) ABSTRACT

A computer-implemented method is disclosed that comprises receiving a content item and analyzing an audio portion and a frames portion of the content item separately. The analyzing comprises extracting first text from the audio portion, determining first timing information associated with the first text in metadata, extracting second text from the frames portion, and determining second timing information and spatial information associated with the second text. The method further comprises determining, based on the first and second text, one or more categories of the content item, applying one or more rules that are based on the one or more categories to determine whether at least one of the first text, the first timing information, the second text, the second timing information, or the spatial information satisfy the one or more rules, and outputting an indication of whether there is an issue in at least a portion of the content item.

21 Claims, 17 Drawing Sheets

500

| Text 302 (from Audio Portion 312) | Timing Information 303 |
| --- | --- |
| This | Start time, End time |
| advertisement | Start time, End time |
| was | Start time, End time |
| paid | Start time, End time |
| for | Start time, End time |
| ••• | |

FIG. 5

700

| Characters (from Frames Portion 314) | Spatial Information 306 Overlaid with Timing Information 305 |
|---|---|
| T | $\left\{\begin{matrix} x_{T\_1}, y_{T\_1}, z_{T\_1} & x_{T\_3}, y_{T\_3}, z_{T\_3} \\ x_{T\_2}, y_{T\_2}, z_{T\_2} & x_{T\_4}, y_{T\_4}, z_{T\_4} \end{matrix}\right\}$, size |
| h | $\left\{\begin{matrix} x_{h\_1}, y_{h\_1}, z_{h\_1} & x_{h\_3}, y_{h\_3}, z_{h\_3} \\ x_{h\_2}, y_{h\_2}, z_{h\_2} & x_{h\_4}, y_{h\_4}, z_{h\_4} \end{matrix}\right\}$, size |
| i | $\left\{\begin{matrix} x_{i\_1}, y_{i\_1}, z_{i\_1} & x_{i\_3}, y_{i\_3}, z_{i\_3} \\ x_{i\_2}, y_{i\_2}, z_{i\_2} & x_{i\_4}, y_{i\_4}, z_{i\_4} \end{matrix}\right\}$, size |
| s | $\left\{\begin{matrix} x_{s\_1}, y_{s\_1}, z_{s\_1} & x_{s\_3}, y_{s\_3}, z_{s\_3} \\ x_{s\_2}, y_{s\_2}, z_{s\_2} & x_{s\_4}, y_{s\_4}, z_{s\_4} \end{matrix}\right\}$, size |
| ⋮ | |
| **Object(s) (from Frames Portion 314)** | **Spatial Information 306 Overlaid with Timing Information 305** |
| Indication/Reference of Object 307: Candidate Image | $\left\{\begin{matrix} x_{obj\_1}, y_{obj\_1}, z_{obj\_1} & x_{obj\_3}, y_{obj\_3}, z_{obj\_3} \\ x_{obj\_2}, y_{obj\_2}, z_{obj\_2} & x_{obj\_4}, y_{obj\_4}, z_{obj\_4} \end{matrix}\right\}$, size |

FIG. 7

COMPUTER-IMPLEMENTED METHOD AND SYSTEM FOR CONTENT COMPLIANCE CHECKS BASED ON TIMING, SIZING, AND LOCATION ANALYSIS OF INDIVIDUAL COMPONENTS OF MEDIA CONTENT CORRELATED ACROSS THE INDIVIDUAL COMPONENTS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

There is a rise in content being generated and consumed by users. Content may be presented in a variety of forms, for example, including, but not limited to, data, text, sounds, images, graphics, music, photographs, advertisements, videos, streaming contents, webcasts, podcasts, blogs, online forums, and chat rooms. Content can be delivered in a variety of ways, for example, via online systems, streaming systems, television broadcast systems, etc. To protect consumers from misinformation, miscommunication, and/or offensive content, it may be desirable to review certain content prior to publishing or delivering the content to the consumers.

SUMMARY

In an embodiment, a computer-implemented method for analyzing individual components of video content separately and correlating the separate analysis to provide timely content compliance checks against rules is disclosed. The method comprises receiving, by a categorization engine stored in non-transitory memory of a computer system and executable by a processor of the computer system, a content item for presentation in a next available slot that is based on opportunistic scheduling. The method also comprises extracting, by the categorization engine, an audio component and a frames component from the content item. The frames component comprises a set of frames. The method additionally comprises analyzing, by the categorization engine, the audio component and the frames component separately by extracting, by the categorization engine, first text from the audio component, determining, by the categorization engine, based at least in part on the audio component, first timing information associated with the first text, extracting, by the categorization engine, second text from the frames component, and determining, by the categorization engine, based at least in part on the frames component, second timing information and spatial information associated with the second text. The method further comprises determining, by the categorization engine, based on a correlation of the first timing information to the second timing information, a temporal relationship between the first text from the audio component and the second text from the frames component and determining, by the categorization engine, one or more categories of the content item using one or more large language models (LLMs) to generate, using the first text and the second text, a response to one or more questions associated with the one or more categories. The method also comprises applying, by a rules engine stored in the non-transitory memory of the computer system and executable by the processor of the computer system, rules that are based on the determined one or more categories to at least one of the first timing information associated with the first text or the second timing information and the spatial information associated with the second text to determine whether the rules are satisfied. The applying comprises determining whether the temporal relationship between the first text from the audio component and the second text from the frames component satisfies a temporal relationship requirement between audio text and visual text specified by a first rule of the rules, determining whether the second timing information of the second text satisfies a visual text timing requirement specified by a second rule of the rules, and determining whether the spatial information of the second text satisfies a visual text sizing and location requirement specified by a third rule of the rules. The method further comprises inserting a different content item in the next available slot rather than the content item in response to determining at least one of the temporal relationship between the first text from the audio component and the second text from the frames component fails to satisfy the temporal relationship requirement specified by the first rule, the second timing information of the second text fails to satisfy the visual timing requirement specified by the second rule, or the spatial information of the second text fails to satisfy the visual text sizing and location requirement specified in the third rule.

In another embodiment, a computer-implemented method for analyzing individual portions of media content to provide content categorization and content compliance checks against rules depending on the content categorization is disclosed. The method comprises extracting, by a categorization engine stored in non-transitory memory of a computer system and executable by a processor of the computer system, an audio portion and a frames portion from a content item, extracting, by the categorization engine, first text from the audio portion of the content item, and determining, by the categorization engine, based at least in part on the audio portion, first timing information associated with the first text. The method also comprises extracting, by the categorization engine, at least one of second text or an object from the frames portion of the content item, determining, by the categorization engine, based at least in part on the frames portion, second timing information and spatial information associated with the at least one of the second text or the object, and determining, by the categorization engine, one or more categories of the content item using one or more large language models (LLMs) to generate, based on the first text and the at least one of the second text or the object, a response to one or more prompts associated with the one or more categories. The method additionally comprises determining, by a rules engine stored in the non-transitory memory of the computer system and executable by the processor of the computer system, one or more rules based on the determined one or more categories, and applying, by the rules engine, the one or more rules to at least one of the first timing information associated with the first text, the second timing information associated with the at least one of the second text or the object, or the spatial information associated with the at least one of the second text or the object to determine whether the rules are satisfied. The method further comprises displaying, via a user interface (UI) of the computer system, at least a portion of the content item with at least one indicator indicating an issue in the portion of the content item. The issue is based on a determination that the at least one of the first text in association with the first timing information or the second text in association with the spatial information fails to satisfy one or more of the rules.

In yet another embodiment, a computer-implemented method for analyzing individual portions of media content to provide content compliance checks against rules is disclosed. The method comprising receiving, by a categorization engine stored in non-transitory memory of a computer system and executable by a processor of the computer system, a content item, and analyzing, by the categorization engine, an audio portion and a frames portion of the content item separately. The analyzing comprises extracting, by the categorization engine, first text from the audio portion, determining, by the categorization engine, based at least in part on the audio portion, first timing information associated with the first text in metadata, extracting, by the categorization engine, second text from the frames portion, and determining, by the categorization engine, based at least in part on the frames portion, second timing information and spatial information associated with the second text. The method also comprises determining, by the categorization engine, based on the first text and the second text, one or more categories of the content item, and applying, by a rules engine stored in the non-transitory memory of the computer system and executable by the processor of the computer system, one or more rules that are based on the determined one or more categories to determine whether at least one of the first text, the first timing information associated with the first text, the second text, the second timing information associated with the second text, or the spatial information associated with the second text satisfy the one or more rules. The method further comprises outputting, by a presentation component stored in the non-transitory memory of the computer system and executable by the processor of the computer system, based on the applying, an indication of whether there is an issue in at least a portion of the content item.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 5 illustrates example metadata associated with a content item according to an embodiment of the disclosure.

FIG. 7 illustrates example metadata associated with a content item according to an embodiment of the disclosure.

DETAILED DESCRIPTION

Figure 1:
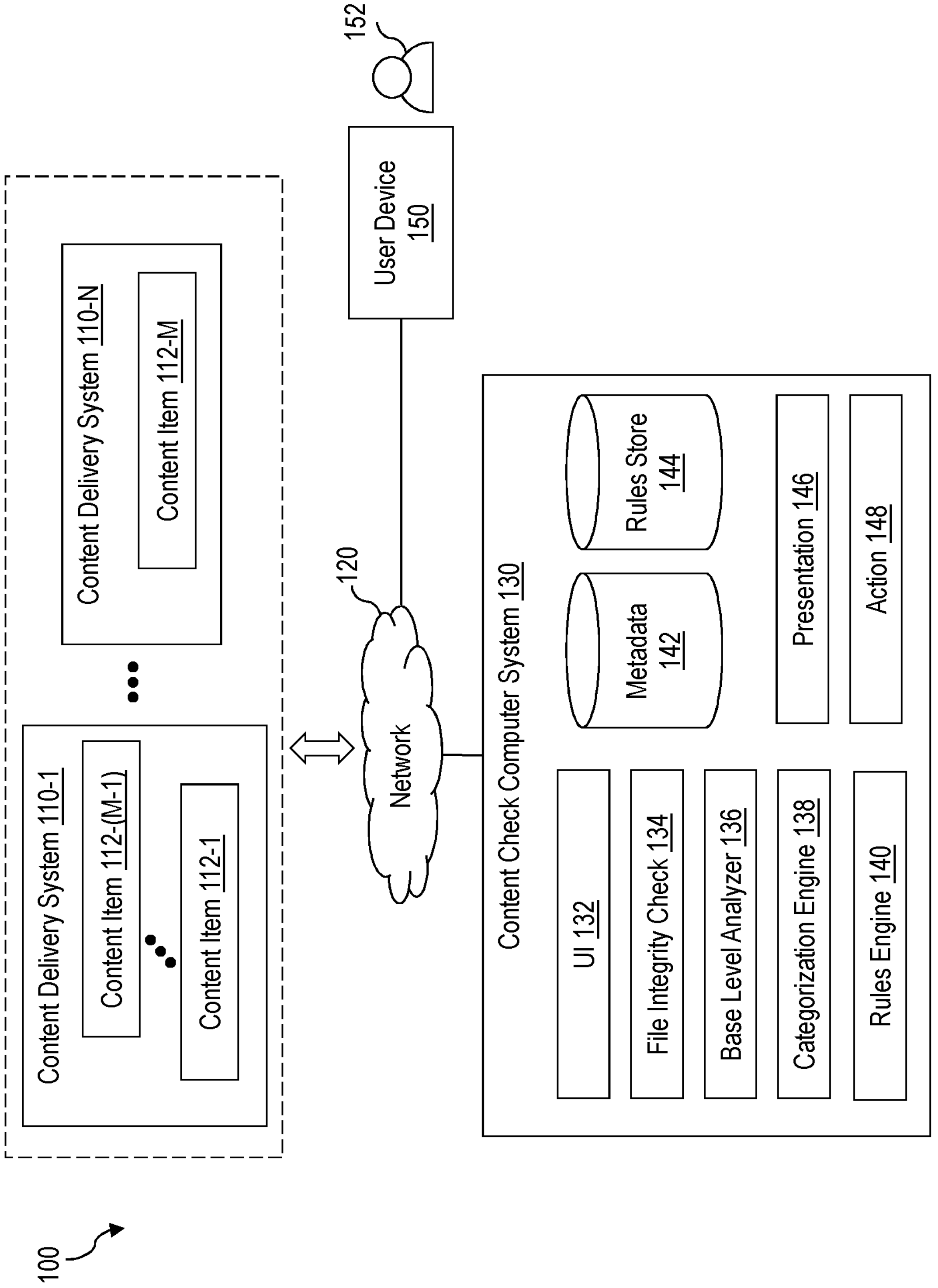
FIG. 1 is a block diagram of a network system including a content check computer system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Traditionally, a human may review content to check for compliance with rules and/or policies prior to being published, delivered, or aired. For instance, advertisements may be reviewed by a human to check for compliance with advertising rules and regulations. As an example, a politically related advertisement (e.g., for election campaigns) may be required to adhere to a certain regulation (e.g., regulated by the Federal Election Commission (FEC)). The regulation may require that a politically related broadcast or video advertisement includes a printed disclaimer visible for a certain duration (e.g., 4 seconds) at the end of the advertisement in textual characters greater than a certain percentage (e.g., 4%) of the vertical screen height. A disclaimer is a statement that identifies the sponsor, and, where applicable, whether the communication was authorized by a certain candidate. The regulation may also require that the advertisement includes an unobscured, full-screen view of the candidate making the disclaimer, or voice-over by the candidate, accompanied by a clearly identifiable image of the candidate in a certain size (e.g., with a height of at least 80% of the vertical screen height). Generally, different types of advertisements (e.g., related to alcohol, drugs, guns, gambling, etc.) may be regulated by different regulations.

A human content review process may include a human viewing and/or listening to the content, identifying issues (e.g., inaccuracies, misinformation, offensive languages and/or images, violence, non-compliant audio format and/or duration, and/or non-compliant image format and/or size, against certain rules and/or policies, etc.), and reporting those issues to a responsible party. The responsible party may update the content to correct the reported issue and the human content review process may be repeated for the updated content. This human content review process can be time consuming, costly, prone to errors, and ultimately unsustainable and/or scalable.

Furthermore, there is a paradigm shift in advertising from using television broadcast to using online streaming. Advertising using television broadcast may be planned ahead of time based on agreements with certain television channels. Thus, the long turn-around time (e.g., tens of minutes, hours, or days) with using a human review process for content compliance checks may be acceptable and feasible. On the other hand, online streaming may utilize opportunistic scheduling for advertising. That is, for streaming advertising services, an advertisement can be scheduled for delivery based on a next available slot (opportunity) rather than based on a deterministic schedule that is planned ahead of time. In some examples, the next available slot may be within a few seconds or a few minutes from the time of scheduling (the opportunistic scheduling). As such, it may not be possible or feasible to use a human review process to meet such a short turn-around time when using online streaming for advertising. Due to the short turn-around time, a human review process would likely be inefficient, ineffective, incomplete, inaccurate and result in missed opportunities.

Additionally, even in traditional broadcasting, the digitalization of broadcasting permits much more near real time digital insertion of content in a way that wasn't traditionally feasible or effective calling for more near real time content checking of incoming content for distribution to safely enable the technology to its fullest extent. Previously, the processes surrounding ad delivery and ultimate broadcast involved a high degree of human interaction for review and assessment of ads against compliance, regulatory or standards policies. While some systems have been deployed to facilitate the technical distribution, the processes related to the review of this content have yet to be systematized. The flexibility and opportunity for multicasting, geocasting, and even unicasting create creative opportunities for highly tailored content to improve user experience resulting in even further volumes of content arriving to be distributed after appropriate review further challenging traditional content checking systems to the point of unsustainability.

To overcome the shortcomings in content review by humans and the technical challenges brought about by advances in content delivery via broadcasting, multicasting, geocasting, unicasting, and streaming, the present disclosure provides techniques to perform content check using a computer implemented content check system (hereinafter, "content check system"). The content check system partitions content into an audio portion (e.g., an audio track) and a frames portion (e.g., a set of image frames), extracts text from the audio portion, and extracts text from the frames portion. The content check system obtains key components for the extracted text, for example, including sizes and/or timing (e.g., beginning time and ending time) of textual characters and/or words, which enables faster and more precise assessment of whether the content complies with certain rules.

According to an embodiment of the present disclosure, a content check system (a computer system for content check) includes a base level analyzer, a categorization engine, a rules engine, a presentation component, and an action component stored in non-transitory memory of the computer system and executable by one or more processor(s) of the computer system. For example, the content check system receives a content file including a content item from a system of a customer. The base level analyzer performs a base level analysis on the received content item. During the base level analysis, the base level analyzer identifies the content type of the file (e.g., advertisements, movies, etc.) and any relevant information associated with the content file (e.g., an asset format, a codec type, a file size, the length of the asset, a video bit rate, a frame rate, an audio bit rate, an audio sampling rate, a video width, a video length, an aspect ratio, audio amplitude maximums and minimums, an audio frequency range, a number of audio channels, etc.). An asset in a content item may refer to an aggregation of audio, text, image, and/or metadata that describe the content item. In some examples, it may be desirable to represent at least some of the information, such as the video bit rate, the frame rate, the audio bit rate, the audio sampling rate, with a high precision of accuracy (e.g., 8, 10, 12, 16 or more significant digits) to enable precise and accurate timing calculation in subsequent processing. In particular, it may be desirable to represent the frame rate with 16 or more significant digits. In some instances, the information identified during the base level analysis may be presented to the customer via a user interface (UI) (e.g., a web user interface) of the computer system. To assist subsequent content check processing, the base level analyzer stores the identified information as metadata and associates the metadata with the content file.

After the base level analysis is performed, the categorization engine partitions the content item into two layers, two components, or two portions: (1) an audio portion (e.g., an audio track or an audio waveform signal) and (2) a frame portion (e.g., a set of frames where each frame includes a still image).

The terms "audio portion," "audio component", and "audio layer" may be used interchangeably herein, such that a description referring to one of the terms shall be treated as though the description also referred to the other term.

The terms "frames portion," "frames component", and "frames layer" may be used interchangeably herein, such that a description referring to one of the terms shall be treated as though the description also referred to the other term.

After partitioning the content item into the audio portion and the frames portion, the categorization engine performs audio analysis on the audio portion and frame analysis on the frames portion. Since the content item is partitioned into separate audio portion and frames portion and each portion is being individually analyzed, the categorization engine works to precisely synchronize the timing of the audio and frames portions. As will be discussed more fully below, the categorization engine uses metadata identified in the base level analysis such as the frame rate, the video bit rate, the audio bit rate, the length of the content asset, and/or other metadata during the audio analysis and the frames analysis.

During the audio analysis, the categorization engine extracts first text from the audio portion. To that end, the categorization engine processes the audio portion, using a speech recognition model, to detect speech from the audio portion. The categorization engine further processes the detected speech, using a speech-to-text transcription model, to convert the detected speech into the first text. The categorization engine also processes the audio portion, using a silence detection model, to identify silent spots (or gaps)

in the audio portion. The detected silent spots may be used to determine the start and/or end of a word in the audio portion.

Next, the categorization engine performs text-to-audio correlation using audio bits (from the audio portion). The base level analysis is involved in this correlation. In particular, the categorization engine takes every word that has been identified (from the audio portion) and associates a start time and an end time (e.g., with respect to a timeline of the audio portion, hereinafter, "audio timeline") with the word down to the millisecond based on bit level analysis on the audio portion. For instance, the start time of a word may be calculated based on the time (in the audio timeline) of the earliest bit of the earliest audio signal sample of the word, and the end time of the word may be calculated based on the time (in the audio timeline) of the last bit of the last audio signal sample of the word.

After the text-to-audio time correlation, the categorization engine correlates audio time (the audio timeline) to frame time (a timeline of the frames portion, hereinafter, "frame timeline"). Based on the audio time-to-frame time correlation, the categorization engine may identify frame(s) that belong to (or are associated with) a certain component of a word in the audio portion. Given the frame rate may typically be about 30 frames per second (fps), multiple frames may correspond to a part of each word. Next, the categorization engine correlates frame time (the frame timeline) to video time (a timeline of the video, hereinafter, "video timeline"). In some examples, the frames portion may have a certain frame rate (e.g., 30 fps), whereas the video may be rendered at a different frame rate (e.g., 29.9 fps). Thus, the categorization engine performs frame time-to-video time correlation to determine a start time and an end for each frame with respect to the video timeline. The aforementioned time correlation steps performed by the categorization engine during the audio analysis result in audio markers per identified word correlated to frames and video markers per identified word.

Stated differently, the categorization engine determines first timing information associated with the first text, where the first timing information includes a start time, an end time, and/or a duration for each word in the first text (e.g., in the form of audio markers and/or video markers). The first timing information may also include a speech rate of the first text, for example, calculate based on the duration of at least a segment of the first text and a number of words in the segment. As part of determining the first timing information for the first text, the categorization engine correlates a timeline of the audio portion to a timeline of the frames portion and to a video timeline (an absolute or true timeline) of the content item.

Based on the audio analysis, the categorization engine stores those audio markers and video markers as additional metadata associated with the content file. The categorization engine may also store additional information obtained from the audio analysis (e.g., audio amplitude and frequency per sample, audio amplitude value association per millisecond, audio frequency value association per millisecond, audio level per sample, etc.) as further metadata associated with the content file.

During the frame analysis, the categorization engine extracts second text from the frames portion. To that end, the categorization engine first processes the frames portion, using an optical character recognition (OCR) model, to detect textual characters from the frames portion. More specifically, the OCR is performed frame by frame to identify textual characters from each frame. For instance, the categorization engine may input the set of frames, frame by frame, to the OCR model and receive, from the OCR model, for each frame, textual characters identified from the frame and corresponding pixel coordinates (e.g., (x, y) coordinates with respect to a frame coordinate system of an individual frame) bounding each textual character. As an example, for each textual character, the pixel coordinates may include a first pixel coordinate corresponding to a top left corner of a region bounding the textual character, a second pixel coordinate corresponding to a bottom left corner of the bounding region, a third pixel coordinate corresponding to a top right corner of the bounding region, and a fourth pixel coordinate corresponding to a bottom right corner of the bounding region. The categorization engine also calculates the size of each textual character based on the pixel coordinates bounding the textual character. As discussed above, some regulations may regulate the size of textual characters in visual form based on a percentage of a display screen. Thus, the categorization engine may calculate the size of a textual character as a percentage with respect to the size of an individual frame.

Next, the categorization engine correlates each textual character to the audio time and the video time and overlays a time component with the pixel coordinates. The pixel coordinates overlaid with time may be represented by (x, y, z), where z corresponds to the time component. In some examples, each textual character may have a first set of pixel coordinates (e.g., corresponding to the four corners of a bounding region) overlaid with time from the frame timeline, a second set of pixel coordinates overlaid with time from the audio timeline, and a third set of pixel coordinates overlaid with time from the video timeline. The categorization engine places all of the textual characters and words in a linear sequence based on when and where each textual character was detected using the (x, y) coordinates and the corresponding z time component and sends that sequence to a text generation algorithm, which correlates the textual characters and/or words to frames. The linear sequence of textual characters and/or words correspond to the second text. As discussed above, some regulations may regulate that certain textual characters are to be visible for a certain duration. Thus, the categorization engine may also determine a start time, an end time, and/or a duration for each textual character and/or for each word in the second text. In an example, the start time of a textual character may refer to the time associated with a bottom left pixel coordinate bounding the textual character.

Stated differently, the categorization engine may determine spatial information and second timing information associated with the second text, where the spatial information includes a size (e.g., a percentage size) and/or a pixel coordinate of each of one or more textual characters in the second text, and the second timing information includes a start time of each of the one or more textual characters based on a respective pixel coordinate. As part of determining the second timing information for the second text, the categorization engine correlates the timeline of the frames portion to the timeline of the audio portion and the video timeline of the content item.

In an embodiment, the frame analysis may include object detection. In such embodiments, the categorization engine may process the frames portion, using an object detection model, to identify object(s). More specifically, the categorization engine may perform frame-by-frame object detection. In some instances, the object detection model may be fed specific images to look for certain objects. In some instances, the object detection model may also leverage the second text from the OCR to enable faster object detection with more precision. After detecting object(s) from the frames portion, the categorization engine may determine third timing information and spatial information for each object in a similar way as for the textual characters discussed above.

In an embodiment, the categorization engine may determine, based on a correlation of the first timing information with the second timing information and/or the third timing information, that the first text from the audio portion corresponds to certain frames of the set of frames from which the second text and/or the object(s) are extracted. Thus, the categorization engine may determine that the first text is associated with the second text and/or object(s). Referring to the example of the political advertisement discussed above, the advertisement is to display a disclaimer in a visual textual form and an image of a candidate on a screen with the voice of the candidate stating the disclaimer. As will be discussed further, rules can be applied to the timing and/or sizing of text(s) and/or object(s) identified from the audio analysis and the frame analysis.

Based on the frame analysis, the categorization engine stores the second timing information and the spatial information associated with the second text and the third timing information and the spatial information associated with the object(s) (if object(s) are detected) as additional metadata associated with the content file. The categorization engine may also store any additional information obtained from the frame analysis (e.g., frame entropy values per frame, frame to time association, identification of black frames, etc.) as further metadata associated with the content file.

After the audio analysis and the frames analysis are performed, the categorization engine may perform text-to-inference to determine one or more categories of the content item based on the first text (extracted from the audio portion), the second text (extracted from the frames portion), and/or object(s) (detected from the frames portion). For instance, the categorization engine may utilize at least one large language model (LLM). The categorization engine may feed the LLM the entire narrative of the first text without the first timing information or the audio markers. The categorization engine may input particular prompts or deterministic questions to the LLM for the LLM to provide answers using the narrative of the first text. Some examples of deterministic questions may include, but are not limited to, "Is this politically related?", "What are the names mentioned?", "Is a candidate mentioned?", "Which office is the candidate running for?", "Is a brand present?", "Which brand?", "Is there a drug mentioned?", "Is there a logo?", etc.). Some examples of content categories may include, but are not limited to, politics, healthcare, pharmaceutical, cannabidiol (CBD), alcohol, adult content, guns, and gambling.

The precision and/or accuracy of the LLM output may be dependent on the prompts or questions input to the LLM. Multiple passes of feeding questions to the LLM may be used to determine the one or more categories for the content item. As an example, if the LLM outputs a "yes" in response to a question: "Is this politically related or not?", then the categorization engine may determine that the content can be categorized under politics. If, however, the answer is a "no", another question, e.g., "Is there a drug mentioned", can be input to the LLM. Further, in embodiments, the categorization engine may utilize multiple LLMs to determine the one or more categories. Using multiple LLMs can provide more robustness in categorization.

In a similar way, the categorization engine may determine one or more categories using the second text (from the frames portion) by inputting particular prompts or deterministic questions to the LLM for the LLM to provide answers using the narrative of the second text. In some instances, the same LLM may be fed with the first text and the second text separately or jointly for text-to-inference. In other instances, one LLM may be fed with the first text for text-to-inference and another LLM may be fed with the second text for text-to-inference. In some instances, an inference based on the first text may indicate the same content category as an inference based on the second text. In other instances, an inference based on the first text may indicate a different content category than an inference based on the second text. Generally, a content item can be of one or more categories.

In an embodiment, as part of determining the one or more categories for the content item, the categorization engine further determines a subject matter (or topic) related to the first text from the audio portion and determines a frequency of appearance of the second text and/or a frequency of appearance of the object(s) (e.g., images of guns or mentions of guns as text in the frames) from the frames portion. Based on the subject matter and the frequency of appearance of the second text and/or the object(s), the categorization engine determines contextual information of the content item. The categorization engine may determine the one or more categories of the content item further based on the contextual information. For instance, the categorization engine further feeds the contextual information (along with the first and/or second texts) to the LLM for the LLM to further use the contextual information to provide answers to prompts or deterministic questions. In general, the categorization engine may utilize one or more LLMs to generate answers to prompts or deterministic questions using the first text (from the audio portion), the second text (from the frames portion), and/or the contextual information.

After the one or more categories are determined, the rules engine selects and applies rules according to the determined one or more categories of the content item. In some examples, the rules may be based on a regulation (e.g., FEC when the content item is related to advertising an election campaign) and/or a policy of the customer. To apply the rules, the categorization engine may utilize at least one LLM (e.g., different than the LLM(s) used for content categorization) to locate relevant or specific message(s) (e.g., a disclaimer) in the first text and/or the second text by inputting particular prompts or deterministic questions (e.g., "Is there a sponsorship message?", "What is the sponsorship message?", etc.) to the LLM. The prompts or deterministic questions may vary depending on the specific message of interest. The rules engine may locate that message(s) identified by the LLM, confirm the size of that message(s), and/or correlate that message(s) with other pieces of the content item based on the additional metadata determined during the audio and/or frames analysis steps. That is, the rules engine may determine the timing, size, and/or other information related to that message(s) and check against the rules to determine whether the rules that pertain to the one or more determined categories are satisfied.

Stated differently, as part of applying the rules, the rules engine identifies (or locates) a specific message within the first text extracted from the audio portion using at least one LLM to generate, using the first text, a response to one or more questions associated with the specific message. The rules engine further determines, based on the first timing information, at least one of a start time, a duration, an end time, or a speech rate associated with the specific message. The rules engine further determines whether the at least one of the start time, the duration, the end time, or the speech rate associated with the specific message satisfies one or more of the rules. Additionally or alternatively, the rules engine identifies (or locates) a specific message within the second text extracted from the frames portion using at least one LLM to generate, using the second text, a response to one or more questions associated with the specific message. The rules engine further determines, based on the spatial information associated with the second text, a size of an individual textual character in the specific message with respect to a size of an individual frame of the set of frames. The rules engine further determines whether the size of the individual textual character in the specific message satisfies a threshold in one or more of the rules. Additionally or alternatively, the rules engine determines, based on the second timing information, whether the at least one of a start time, an end time, or a duration associated with the specific message located from the second text satisfies a threshold in one or more of the rules.

Based on the application of the rules, the presentation component may present a result from the application of the rules to the customer in a variety of ways. In some instances, what is presented to the customer may depend on what the particular customer wants to see and how they want to see the result. In an embodiment, portions of the content item are presented to the customer via the UI for the customer to approve or deny the content item. The portions of the content item presented may include any portion of the content item that was determined to not satisfy one or more rules. In another embodiment, the presentation component presents, via the UI, at least a portion of the content item with an overlay including an indicator indicating an issue in the portion of the content item. For example, the indicator may include a pointer, an arrow, and/or a ruler to illustrate an issue with the size of a message or an object. The presentation component may also present, via the UI, the entire content item with overlaid highlight points to allow the customer to jump to specific portion of the content item with the issue. In yet another embodiment, the presentation component outputs (e.g., via the UI) a recommendation (or guidance) to correct an issue in the content item. For example, the recommendation may indicate a size of a certain object in particular may need to be increased to meet a minimum size according to a certain rule. In yet another embodiment, the action component may approve or reject the content item based on the application of the rules, and the presentation component may output (e.g., via the UI) an indication of whether the content item is accepted or rejected. If the action component rejected the content item, the action component may further provide reason(s) of the rejection, and the presentation component may also indicate, to the customer, the reason(s) for the rejection.

In some embodiments, the action component may correct or fix issue(s) in the content item indicated by the rules application. Once the issue(s) with the content item are corrected, the corrected content item may be provided back to the content check system to allow the content check system to process the content item as described above. In some embodiments, the action component may also fact check factual statements in the content item, identify sources consistent and/or inconsistent with the factual statements, and present those sources to the customer (e.g., via the UI).

In some embodiments, the content check system may further check the integrity of the content file. For instance, the content check system confirms that the content file is not corrupted and/or checks for malware before performing the base level analysis. In some cases, after receipt of the content file and before any analysis is performed, the content check system may check the audio signature and/or the video signature to see if the content check system has seen the exact content item before from the particular customer providing the content item. If so, the content check system may accept or reject the content item based on the earlier assessment.

Using a content check system to check a content item for compliance with rules can allow a customer to receive a content check result quickly, e.g., near real-time that would otherwise be impossible when using human review processes. As an example, in some instances, the content check system may provide a content check result in a few seconds to a few minutes instead of tens of minutes or hours with a human review process. Thus, a customer can integrate content check as a part of a near real-time content delivery workflow, for example, sending every content item to the content check system prior to delivering the content item. For instance, a streaming advertising service may utilize opportunistic scheduling to schedule an advertisement (e.g., a late arrival advertisement) to be delivered in the next available slot, which may be within a few second or a few minutes from the time of scheduling. The content check system may provide the streaming advertising service with content compliance checks against rules in a timely manner prior to the next available slot. That is, the content check system can provide "just-in-time" content compliance checks, for example, after the time of scheduling and before the next available slot. For instance, if the content check system indicates that the advertisement satisfies certain rules, the streaming advertising service may insert the advertisement into the next available time slot. If, however, the content check system indicates that the advertisement fails to satisfy certain rules, the streaming advertising service may not insert the advertisement into the next available time slot and may use the next available slot for opportunistic scheduling of another advertisement. This is particularly valuable to both advertisers and media companies when seeking to respond to time-relevant events (e.g. sports, politics, natural events). This stringent opportunistic scheduling timeline in streaming advertising services is impossible to be met when using a human review process.

Additionally, the content check system may provide more precise, accurate, and consistent content check results than using a human review process. In order to provide more precise, accurate, and consistent content checks and timely deliver such results, the content check system addresses technical challenges that are not an issue or contemplated with a human review process. For example, in a human review process, the human reviews the content made up of its various components (video, audio, etc.) in unison by simply playing and observing the content. The content check system on the other hand breaks the content into its related component parts and analyzes the individual components or portions separately and then correlates the separate analysis to provide content compliance checks against rules. As discussed above, rules for politically related advertisements may include a sponsorship message requirement, a certain temporal relationship between an audio sponsorship message and a visual sponsorship message, and/or certain requirements for timings, sizing, and/or locations for the visual sponsorship message and an associated candidate image. The content check system provides a technical solution to address the intertwined complexities of such rules. For example, as part of the individual component analysis, the content check system calculates timings of text from the audio portion, text from the frames portion, and/or object from the frames portion with respect to the different timelines (e.g., audio timeline, frames timeline, and video timeline) and correlates the different timelines down to an accuracy of milliseconds. Further, the content check system to determines the locations and/or calculates the sizing of visual text and/or a candidate image with a high accuracy in terms of pixels. The particular technical solutions provided by the content check system enable timing, sizing, and/or location accuracies that may be significantly more precise and accurate than what a human review agent can provide.

The content check system may be easily tuned according to a customer's policy by adding, deleting, or adjusting the rules. For instance, one customer may have strict standards regarding whether the content passes or fails (e.g., the content must pass all of the rules) while another customer may have more relaxed standards (e.g., the content must pass a certain number of rules, but not all the rules, or the content must pass certain rules and other rules can be failed, etc.). The content check system may execute content check for each customer in an isolated, secured environment (e.g., a container) and configure the rules according to the respective customer's preferences.

Turning to FIG. 1, a network system 100 including a content check computer system 130 is described. The network system 100 may include N number of content delivery systems 110 (individually shown as 110-1 to 110-N, where N may be any suitable integer value), a network 120, a content check computer system 130, which may be referred to as a computer system 130, and a user device 150 (e.g., of a content consumer 152).

The network 120 promotes communication between the components of the network system 100. The network 120 may be any communication network including a public data network (PDN), a public switched telephone network (PSTN), a private network, and/or a combination. The user device 150 may be a cell phone, a mobile phone, a smart phone, a personal digital assistant (PDA), an Internet of things (IoT) device, a wearable computer, a headset computer, a laptop computer, a tablet computer, a notebook computer, a television, a smart television, and/or other suitable communication devices.

The content delivery systems 110 may include online systems, streaming systems, television broadcast systems, and/or any suitable computer systems for distributing or delivering content. Each of the content delivery systems 110 may deliver one or more content items 112 to one or more user devices (e.g., the user devices 150) of one or more respective consumers (e.g., the consumer 152). In the illustrated example of FIG. 1, the content delivery system 110-1 may deliver multiple content items 112-1 to 112-(M−1), whereas the content delivery system 110-N may deliver a single content item 112-M. The content items 112 may include any media content, for example, including, but not limited to, data, text, sounds, images, graphics, music, photographs, advertisements, and videos, streaming contents, webcasts, podcasts, blogs, online forums, and chat rooms. Further, the content items 112 may be of various types or categories, for example, including but not limited to, politics, healthcare, pharmaceutical, CBD, alcohol, adult content, guns, or gambling. In some examples, a content delivery system 110 may be a content provider of a respective content item 112. In other examples, the content provider of a certain content may be different from a respective content delivery system 110 that delivers the content item 112.

The computer system 130 may include a file integrity check component 134, a base level analyzer 136, a categorization engine 138, a rules engine 140, a presentation component 146, and an action component 148 stored in non-transitory memory of the computer system 130 and executed by one or more processor(s) of the computer system 130. The computer system 130 may further include metadata 142 and a rules store 144 stored in memory of the computer system 130. The computer system 130 may further include a UI 132 (e.g., a web browser interface).

As discussed above, to protect consumers from misinformation, miscommunication, and/or offensive content, it may be desirable to review a certain content item 112 prior to publishing or delivering the content item 112 to the consumers 152. To that end, each of the content delivery systems 110 may send a content item 112 to the computer system 130 for content check prior to delivering or airing the content item 112. In an example, a certain company may run a content delivery system 110 and may be a customer of a company that provides the computer system 130 for content check. In another example, the content delivery system 110 may be used by a regulatory agency (e.g., the FEC) to check content for compliance with regulations.

At a high level, the computer system 130 may receive a file including a content item 112 (e.g., the content item 112-1) from a respective content delivery system 110 (e.g., the content delivery system 110-1). The file integrity check component 134 may operate on the file and check for corruption, malware, and/or signatures. The base level analyzer 136 may perform base level analysis on the content item 112-1 to obtain various information (e.g., an asset format, a codec type, a file size, the length of the asset, a video bit rate, a frame rate, an audio bit rate, a video width, a video length, an aspect ratio, audio amplitude maximums and minimums, an audio frequency range, a number of audio channels, etc.). The base level analyzer 136 may store the identified information in the metadata 142 and associate the metadata 142 with the content item 112-1. The categorization engine 138 may perform audio analysis and frame analysis separately to extract texts from the content item 112-1. The categorization engine 138 may further obtain key components for the extracted texts, for example, including sizes and/or timing (e.g., beginning time and ending time) of textual characters and/or words, e.g., using the information identified by the base level analyzer 136 and stored in the metadata 142. The categorization engine 138 may store information obtained from the audio and/or frame analysis to the metadata 142. The categorization engine 138 may further determine one or more categories for the content item 112-1 based on the extracted texts.

The rules store 144 may include various rules for checking content compliances (e.g., in terms of timings, durations, sizes, etc., of certain texts and/or objects). As mentioned above, different categories of content may have different rules and/or regulations. Accordingly, the rules engine 140 may perform assessment or evaluation on the content item 112-1 using certain rule(s) selected from the rules store 144 based on the determined one or more categories of the content item 112-1. As part of the assessment, the rules engine 140 may determine whether the content item 112-1 satisfies the selected rule(s), e.g., using information obtained from the audio and/or frame analysis and stored in the metadata 142. The presentation component 146 may present the output obtained from the application of the selected rule(s) to the content delivery system 110-1 in various ways (e.g., via the UI 132). In some cases, the action component 148 may take action to correct issues indicated by the rules engine 140 based on the application of the selected rule(s). The operations of the file integrity check component 134, the base level analyzer 136, the categorization engine 138, the rules engine 140, the presentation component 146, and the action component 148 are discussed more fully below in connections with FIGS. 2-14. For simplicity, FIGS. 2-14 describe content check mechanisms being applied to the content item 112-1. However, similar content check mechanisms can be applied to any other content item 112.

Figure 17:
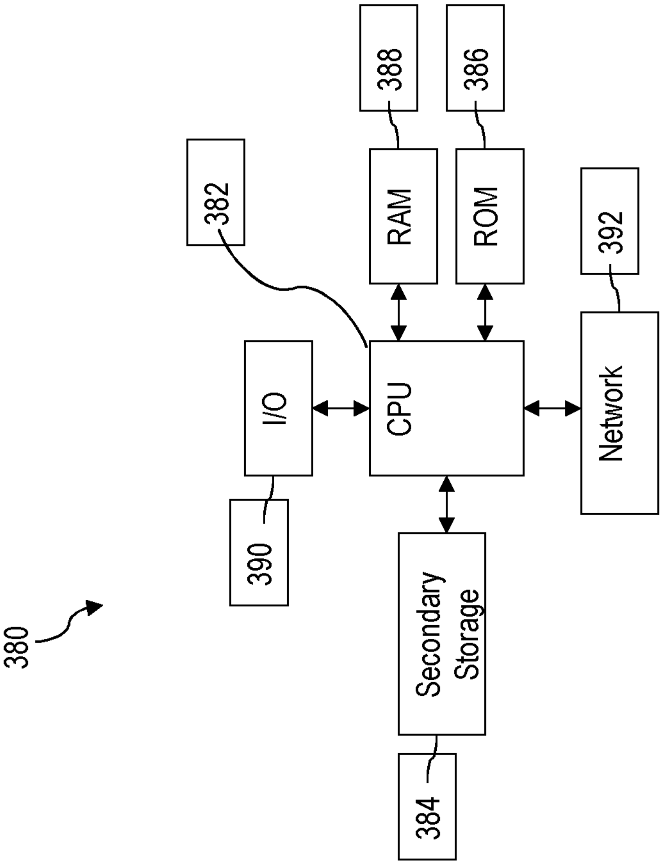
FIG. 17 is a block diagram of a computer system according to an embodiment of the disclosure.

In embodiments, the computer system 130 may be similar to the computer system 380 of FIG. 17. In embodiments, the computer system 130 may be a cloud computing platform including compute resources (e.g., central processing units (CPUs), graphical processing units (GPUs)), memory resources, and storage resources. The operations of the file integrity check component 134, the base level analyzer 136, the categorization engine 138, the rules engine 140, the presentation component 146, and the action component 148 may be scheduled in any suitable ways (e.g., using a waterfall scheduling scheme and/or a concurrent or pipelining scheduling scheme) to optimize the processing time so that content check can be provided in real-time or at least close to real time. Further, the computer system 130 may perform content check for multiple content delivery systems 110 (customers) at the same time. To provide security, the computer system 130 may execute content check operations for different content delivery systems 110 in different isolated environments. For example, the computer system 130 may execute content check operations for each content delivery system 110 in a separate, isolated container or virtual machine.

FIG. 1 is merely an example of components of a content check system, and variations are contemplated to be within the scope of the present disclosure. In embodiments, the content check system may include other components not illustrated in FIG. 1. In embodiments, the content check system may not include every component illustrated in FIG. 1. In embodiments, the components and connections may be implemented with different connections than those illustrated in FIG. 1. Such and other embodiments are contemplated to be within the scope of the present disclosure.

Figure 2:
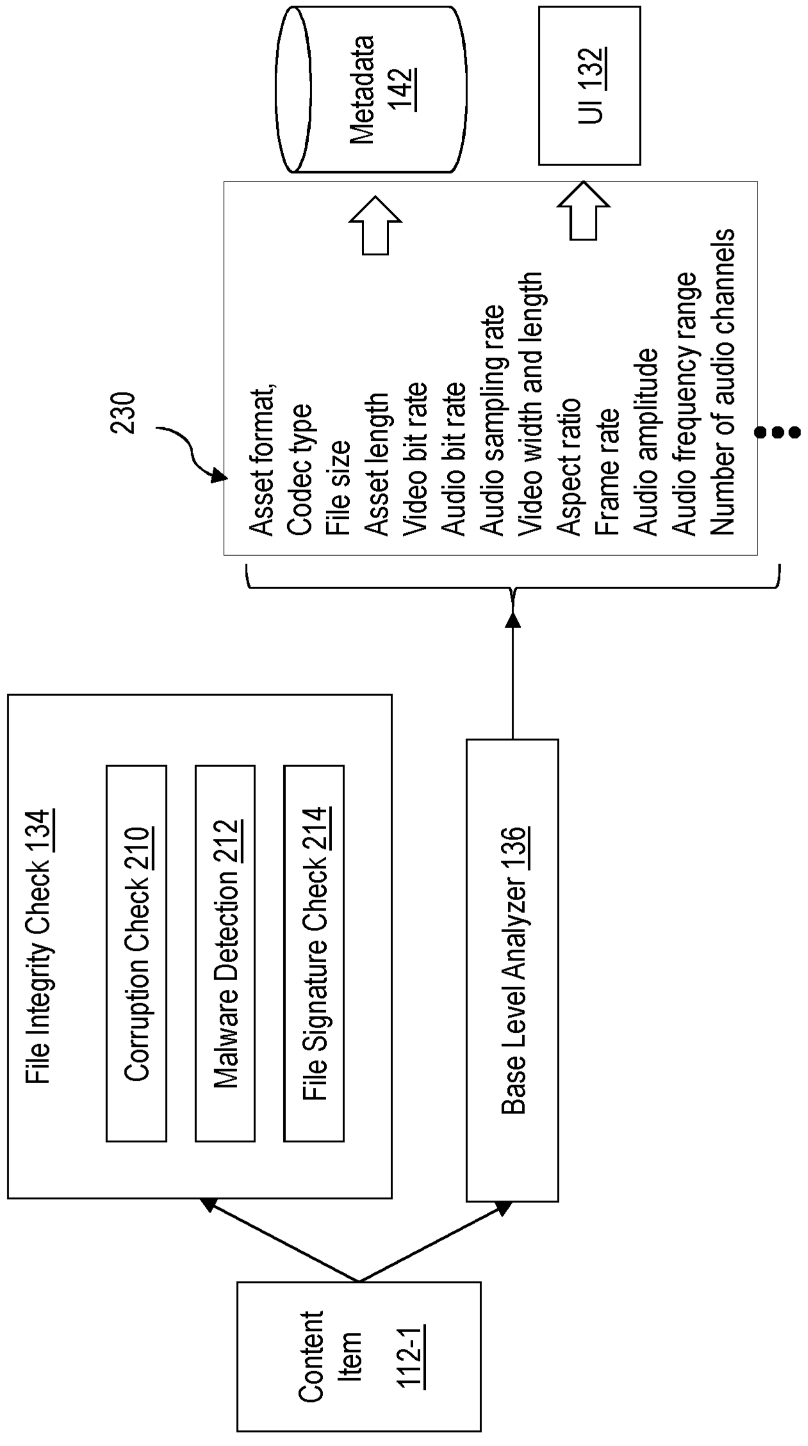
FIG. 2 is a block diagram illustrating components and/or operations for file integrity check and base level analysis according to an embodiment of the disclosure.

Turning now to FIG. 2, components and/or operations for file integrity check and base level analysis are described. The file integrity check component 134 may receive a content file including the content item 112-1 (e.g., from the content delivery system 110-1). The file integrity check component 134 may include a corruption check component 210, a malware detection component 212, and a file signature check component 214. For instance, the corruption check component 210 may check a checksum of the content file to confirm that the content file is not corrupted prior to performing further processing on the file. Additionally or alternatively, the malware detection component 212 may check for malware prior to performing further processing on the file. Additionally or alternatively, the file signature check component 214 may check the audio signature and/or the video signature of the file to see if the computer system 130 (the content check system) has seen the exact content item 112-1 before from the particular customer (the content delivery system 110-1) providing the content item 112-1. If so, the file signature check component 214 may accept or reject the content item 112-1 based on the previous assessment without continuing with subsequent content check operations.

After the file integrity check, the base level analyzer 136 may perform base level analysis on the content item 112-1 to output information 230. For instance, the information 230 may include the asset format, the codec type, the file size, the length of the asset, the video bit rate, the frame rate, the audio bit rate, the video width, the video length, the aspect ratio, the audio amplitude maximums and minimums, the audio frequency range, the number of audio channels, and/or other suitable information of the content item 112-1. In some examples, some of the information 230 may be calculated based on metadata that are included in the content file while other information 230 may be detected from the content item 112-1 itself. In some instances, the precision of at least some of the information 230 (e.g., related to timings) may be sufficiently high (e.g., with 8, 16 or more significant digits) so that subsequent processing may operate on accurate, high precision timings. As an example, the asset may be an audio track and/or a set of frames, and the length of the asset may be in the form of hh:mm:ss:mmm (where hh represents hours, mm represents minutes, ss represent seconds, and mmm represents milliseconds). That is, the length of the asset may be accurate to the millisecond. In some instances, the frame rate may have more than 16 significant digits. To assist subsequent content check processing, the categorization engine stores the identified information as metadata 142 and associates the metadata 142 with the content file. In embodiments, the base level analyzer 136 may optionally present the information 230 identified during the base level analysis to the customer via UI 132 (e.g., in the form of a dashboard).

Figure 3:
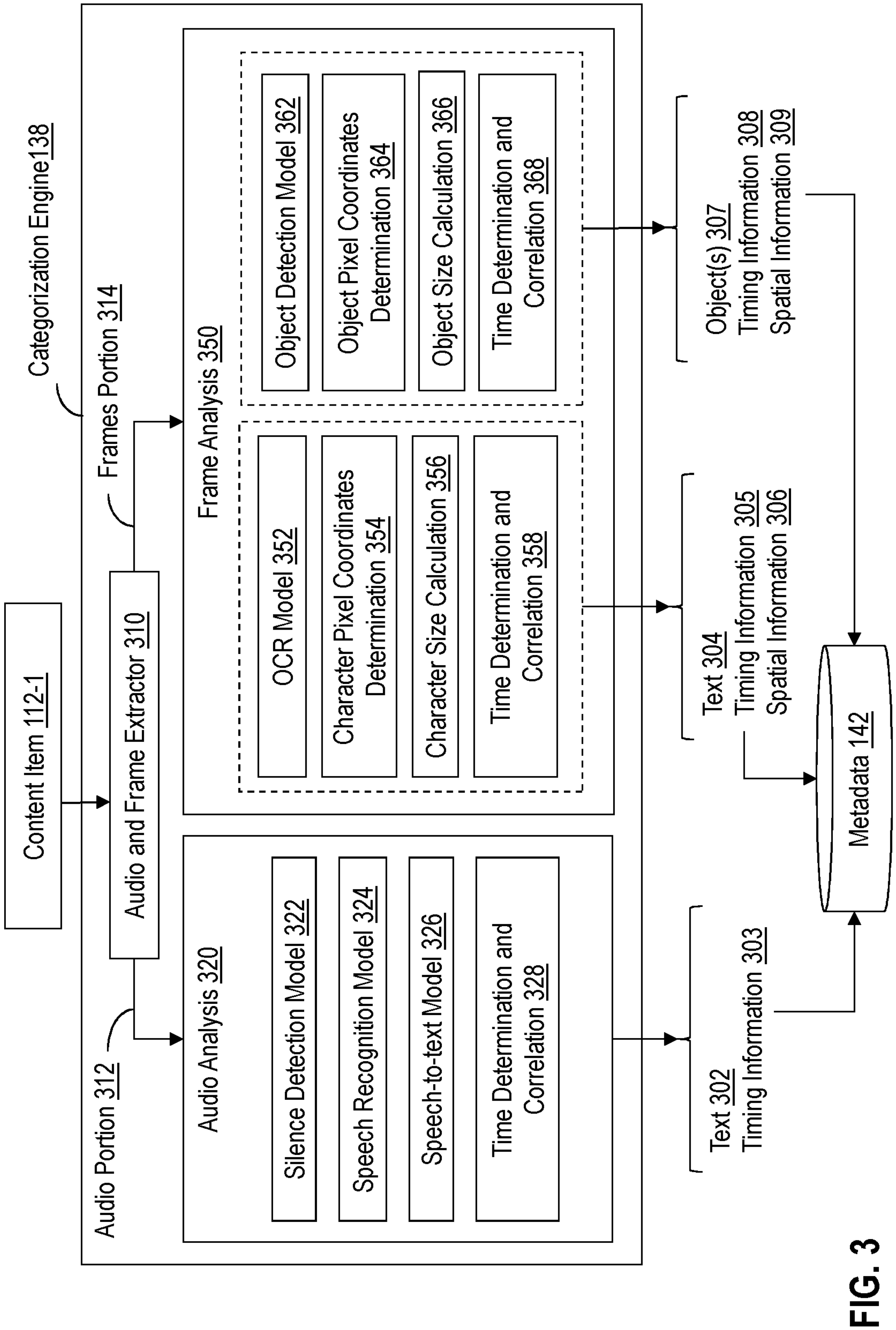
FIG. 3 is a block diagram illustrating components and/or operations for content categorization according to an embodiment of the disclosure.

Turning now to FIG. 3, components and/or operations for content categorization are described. After the file integrity check and base level analysis, the categorization engine 138 may receive the content item 112-1. As shown, the categorization engine 138 may include an audio and frame extractor 310, which may extract an audio portion 312 (e.g., an audio track or audio waveform signal) and a frames portion 314 (e.g., a set of frames) from the content item 112-1. As discussed above, the categorization engine 138 may separately perform audio analysis 320 on the audio portion 312 and frame analysis 350 on the frames portion 314.

At a high level, for the audio analysis 320, the categorization engine 138 may extract a text 302 (e.g., first text) from the audio portion 312 and determine timing information 303 (e.g., first timing information) associated with the text 302 based at least in part on the audio portion 312. For instance, the categorization engine 138 may include a silence detection model 322, a speech recognition model 324, a speech-to-text model 326, and a time determination and correlation component 328.

To extract the text 302, the categorization engine 138 may process the audio portion 312, using the speech recognition model 324, to detect speech and process the detected speech, using the speech-to-text model 326, to convert the detected speech to the text 302. In some examples, the speech recognition model 324 and/or the speech-to-text model 326 may be based on neural networks, machine learning (ML), deep learning, and/or any suitable techniques well-known to one skilled in the art.

To determine the timing information 303 (for the text 302 from the audio portion 312), the time determination and correlation component 328 may determine a start time and/or an end time (e.g., in the form of audio markers) for each word in the text 302. To that end, the categorization engine 138 may process the audio portion 312, using the silence detection model 322, to detect silence (or gaps) in the audio portion 312. The time determination and correlation component 328 may determine the start time and/or end time of a word in the text 302 based on the detected silence or gaps. The start time and/or end time for each word may be based on a timeline of the audio portion 312 (e.g., the audio timeline 402 shown in FIG. 4 and FIG. 6). The time determination and correlation component 328 may obtain the audio bit rate and number of bits per audio sample from the metadata 142 and calculate the audio timeline based on the audio bit rate. The start time for a certain word may refer to the earliest bit of the earliest signal sample of the certain word, and the end time for the certain word may refer to the last bit of the last signal sample of the certain word.

The time determination and correlation component 328 may also calculate a duration of each word in the text 302. The time determination and correlation component 328 may also calculate a speech rate (e.g., number of words per minute) of the text 302. For instance, the time determination and correlation component 328 may count the number of words in the text 302, calculate a duration of the text 302 based on a difference between the start time of the beginning word in the text 302 and the end time of the last word in the text 302, and divide the number of words by the duration of the text 302.

Figure 4:
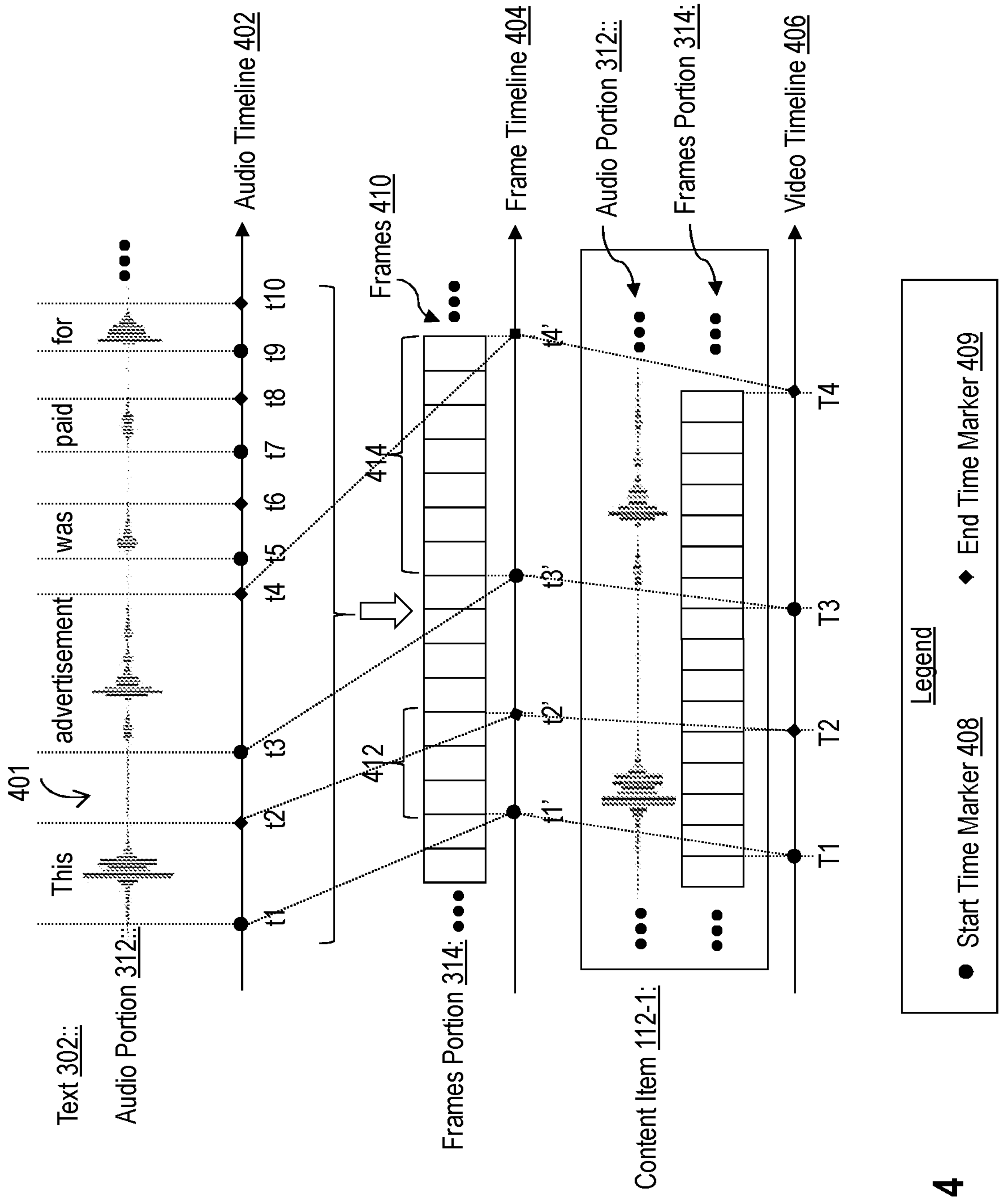
FIG. 4 illustrates an example audio analysis method for content check according to an embodiment of the disclosure.
Figure 6:
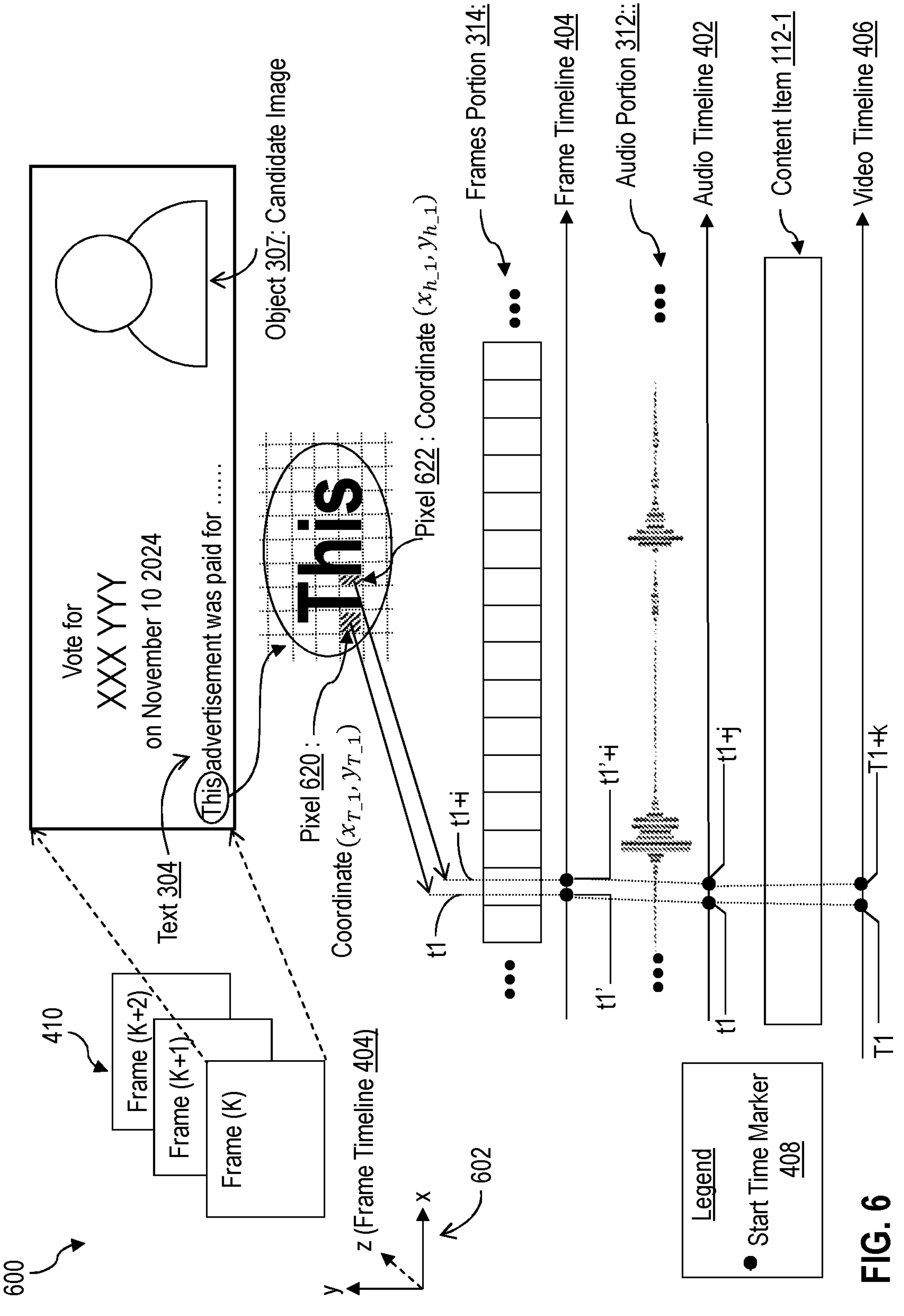
FIG. 6 illustrates an example frame analysis method for content check according to an embodiment of the disclosure.

The time determination and correlation component 328 may further correlate the audio timeline to a timeline of the frames portion 314 (e.g., the frame timeline 404 shown in FIG. 4 and FIG. 6) and to a video timeline of the content item 112-1 (e.g., the video timeline 406 shown in FIG. 4 and FIG. 6). The correlation between the start time and/or stop time of each word in the text 302 to the frame timeline and to the video timeline will be discussed more fully below with reference to FIG. 4.

Turning now to FIG. 4, an example audio analysis method 400 for content check is described. In FIG. 4, the top portion illustrates the audio portion 312 (e.g., an audio waveform with varying amplitudes) with respect to the audio timeline 402, the middle portion illustrates the frames portion 314 with respect to the frame timeline 404, and the bottom portion illustrates the content item 112-1 (a video component including the audio portion 312 and the frames portion 314) with respect to the video timeline 406.

In the illustrated example of FIG. 4, the text 302 in the audio portion 312 includes an audio statement: “This advertisement was paid for . . . ”. For instance, the content item 112-1 is an advertisement for an election campaign. As shown in FIG. 4, the words in the text 302 is separated by gap or silence spots 401. For ease of illustration, FIG. 4 only shows the label 401 for gap between the word “This” and “advertisement”. The start time and end time for each word in the text 302 are marked respectively by a start time marker 408 and an end time marker 409. For instance, in the audio timeline 402, the start time and end time for the word “This” are respectively shown by t1 and t2, the start time and end time for the word “advertisement” are respectively shown by t3 and t4, and so on. The audio time t1, t2, t3, etc. may be determined based on the silence detection discussed above.

The time determination and correlation component 328 may correlate or synchronize the audio timeline 402 with the frame timeline 404. In the illustrated example of FIG. 4, the frames portion 314 may include a number of frames 410. The time determination and correlation component 328 may calculate the frame timeline 404 based on the frame rate determined during the base level analysis. Based on the correlation or synchronization to the frame timeline 404, the time determination and correlation component 328 may identify frame(s) that belong to (or are associated with) a certain component of a word in the audio portion 312. For instance, the start time and end time for the word “This” are respectively at t1' and t2' in the frame timeline 404, the start time and end time for the word “advertisement” are respectively at t3' and t4' in the frame timeline 404, and so on. A group of consecutive frames between t1' and t2' (shown by 412) may correspond to the word “This” in the audio portion 312. Another group of consecutive frames between t3' and t4' (shown by 414) may correspond to the word “advertisement” in the audio portion 312. Generally, the number of frames corresponding to a word may vary depending on the frame rate and the speech rate. The time determination and correlation component 328 may further correlate or synchronize the frame timeline 404 to the video timeline 406. The time determination and correlation component 328 may calculate the video timeline 406 based on the asset frame length determined during the base level analysis. As discussed above, the frame rate of the frames portion 314 (e.g., at 30 fps) may be different than the frame rate used for rendering the video (e.g., at 29.9 fps). Thus, the correlation of the frame timeline 404 to the video timeline 406 may take into account the different frame rates (e.g., by dropping or skipping a frame at certain intervals). For instance, based on the correlation or synchronization to the video timeline 406, the start time and end time for the word “This” are respectively at T1 and T2 in the video timeline 406, the start time and end time for the word “advertisement” are respectively at T3 and T4 in the video timeline 406.

Returning to FIG. 3, after the audio analysis 320 is performed, the categorization engine 138 may add, to the metadata 142, the extracted text 302 in association with the determined timing information 303.

Turning now to FIG. 5, an example data structure 500 associated with the content item 112-1 is described. More specifically, the example data structure 500 may be part of the metadata 142 and may be generated from the audio analysis 320. The data structure 500 includes the text 302 (extracted from the audio portion 312) and corresponding timing information 303. As shown, each word in the text 302 may have corresponding start time and end time. In some examples, the timing information 303 may include multiple pairs of start time and end time, for example, including a first pair of start time and end time (e.g., t1 and t2 for the word “This”) with respect to the audio timeline 402, a second pair of start time and end time (e.g., t1' and t2' for the word “This”) with respect to the frame timeline 404, and a third pair of start time and end time (e.g., T1 and T2 for the word “This”) with respect to the video timeline 406. In some examples, the data structure 500 may further include a duration for each of the words in the text 302 (e.g., calculated based on a difference between a respective start time and a respective end time).

Returning to FIG. 3, at a high level, for the frame analysis 350, the categorization engine 138 may extract a text 304 (e.g., a second text) from the frames portion 314 and determine timing information 305 (e.g., second timing information) and spatial information 306 associated with the text 304 based at least in part on the frames portion 314. For instance, the categorization engine 138 may further include an OCR model 352, a character pixel coordinates determination component 354, a character size calculation component 356, and a time determination and correlation component 358. Further, the categorization engine 138 may optionally identify or detect object(s) 307 from the frames portion 314 and determine timing information 308 (e.g., third timing information) and spatial information 309 associated with the object(s) 307 based at least in part on the frames portion 314. For instance, the categorization engine 138 may further include an object detection model 362, an object pixel coordinates determination component 364, an object size calculation component 366, and a time determination and correlation component 368.

To extract the text 304, the categorization engine 138 may process the frames portion 314, using the OCR model 352, to detect textual characters from the frames portion 314. More specifically, the OCR is performed frame by frame to identify textual characters from each frame 410. For instance, the categorization engine may input the set of frames 410, frame by frame, to the OCR model 352 and receive, from the OCR model 352, for each frame 410, textual characters identified from the frame 410. In some examples, the OCR model 352 may be based on neural networks, ML, deep learning, and/or any suitable techniques well-known to one skilled in the art.

To determine the spatial information 306 for the text 304, character pixel coordinates determination component 354 may determine, for each textual character in the text 304, a first pixel coordinate corresponding to a top left corner of a bounding region of the respective textual character with respect to a frame coordinate system (e.g., the frame coordinate system 602 shown in FIG. 6), a second pixel coordinate corresponding to a bottom left corner of the bounding region with respect to the frame coordinate system, a third pixel coordinate corresponding to a top right corner of the bounding region with respect to the frame coordinate system, and a fourth pixel coordinate corresponding to a bottom right corner of the bounding region with respect to the frame coordinate system. In some examples, the OCR model 352 may output textual characters identified from the frame along with corresponding pixel coordinates bounding each textual character. Subsequently, the character size calculation component 356 may calculate the size of each textual character based on the first, second, third, and/or fourth pixel coordinates describing the bounding region of the respective textual character. The size may be a percentage size with respect to the size of a frame 410. The size of the frame 410 may be calculated based on the video width and the video length obtained from the metadata 142.

To determine the timing information 305 for the text 304 (from the frames portion 314), the time determination and correlation component 358 may determine a start time and/or an end time (e.g., in the form of audio markers) for each textual character in the text 304. The start time and/or end time for each textual character may be based on the frame timeline 404 timeline of the audio portion 312. In an example, the start time for a certain textual character may refer to a time corresponding to a pixel at the bottom left corner of a bounding region of the certain textual character, and the end time for a certain textual character may refer to a time corresponding to a pixel at the bottom right corner of a bounding region of the certain textual character. In another example, the start time for a certain textual character may refer to a time corresponding to a pixel at the top left corner of a bounding region of the certain textual character, and the end time for a certain textual character may refer to a time corresponding to a pixel at the top right corner of a bounding region of the certain textual character. Subsequently, the categorization engine 138 places all of the textual characters and words in a linear sequence based on when and where each textual character was detected using the (x, y) coordinates and the corresponding z time component and sends that sequence to a text generation algorithm, which correlates the textual characters and/or words to frames 410. The linear sequence of textual characters and/or words may correspond to the text 304. Further, similar to the audio analysis 320, the time determination and correlation component 358 may further correlate the frame timeline 404 with the audio timeline 402 and the video timeline 406 as will be discussed more fully below with reference to FIG. 6.

Turning now to FIG. 6, an example frame analysis method 600 for content check is described. FIG. 6 is discussed in connection with FIG. 4. In FIG. 6, the top half portion illustrates the frames portion 314 with respect the frame timeline 404, and the bottom half portion illustrates the audio portion 312 with respect to the audio timeline 402 and the content item 112-1 (including the audio portion 312 and the frames portion 314) with respect to the video timeline 406.

As discussed above with reference to FIG. 4, the word "This" in the audio portion 312 corresponds to a group of frames 412. For instance, the group of frames 412 corresponds to Frame(K), Frame(K+1), and Frame(K+2). FIG. 6 provides an expanded view of Frame(K). In the illustrated example of FIG. 6, Frame(K) includes a printed statement ("This advertisement is paid for . . . ") corresponding to the audio statement in the audio portion 312. That is, the text 304 may include the printed statement ("This advertisement is paid for . . . "). The text 304 may also include the other text in the Frame(K) (e.g., "Vote for . . . "). The Frame(K) further includes the object 307, which may be an image of a candidate (e.g., for the election campaign).

FIG. 6 further provides an expanded view of the textual word "This" of Frame(K). The pixel at the bottom left corner bounding the character "T" in the word "This" is shown by 620. The coordinate of the pixel 620 may be represented by $(x_{T_1}, y_{T_1})$, which may be with respect to the frame coordinate system 602. The frame coordinate system 602 includes a y-axis (a vertical axis) and an x-axis (a horizontal axis) describing the 2-dimensional (2D) plane of a respective frame 410. The frame coordinate system 602 further includes an overlaid z-axis corresponding to the frame timeline 404. The pixel at the bottom left corner bounding the character "h" in the word "This" is shown by 622. The coordinate of the pixel 622 may be represented by $(x_{h_1}, y_{h_1})$, which may be with respect to the frame coordinate system 602. In general, a bounding region may be defined for each individual character and a pixel may correspond to each of the four corners (e.g., a bottom left corner, a bottom right corner, a top left corner, and a top right corner) of the bounding region. In some instances, the pixel 620 may be referred to as a starting pixel for the character "T", and the pixel 622 may be referred to as a starting pixel for the character "h". Similarly, a bounding region may be defined for the object 307 and a pixel may correspond to each of the four corners (e.g., a bottom left corner, a bottom right corner, a top left corner, and a top right corner) of the bounding region. For ease of illustration, FIG. 6 only illustrates the pixels corresponding to the bottom left corner bounding the characters "T" and "h" in the word "This".

As further shown in FIG. 6, the start time for the characters "T" and "h" in the word "This" with respect to the frame timeline 404 are respectively shown as t1' and t1'+i. The start time for the characters "T" and "h" in the word "This" with respect to the audio timeline 402 are respectively shown as t1 and t1+j. The start time for the characters "T" and "h" in the word "This" with respect to the video timeline 406 are respectively shown as T1 and T1+k. The values for i, j, and k may be the same or different depending on the correlations between the frame timeline 404, the audio timeline 402, and the video timeline 406. In general, a start time and an end time may be determined for each textual character in the text 304 and the object 307. For ease of illustration, FIG. 6 only illustrates the start time for the characters "T" and "h" in the word "This".

Returning to FIG. 3, after the frame analysis 350 is performed, the categorization engine 138 may add, to the metadata 142, the extracted text 304 in association with the determined timing information 305 and the spatial information 306, and the information associated with the detected object(s) 307 in association with the determined timing information 308 and spatial information 309.

Turning now to FIG. 7, an example data structure 700 associated with the content item 112-1 is described. More specifically, the example data structure 700 may be part of the metadata 142 and may be generated from the frames analysis 350. The data structure 700 includes the characters in the text 304 (extracted from the frames portion 314) and corresponding spatial information 306 overlaid with corresponding timing information 305. The data structure 700 may include data associated with Frame(K) 410 of FIG. 6. As shown, the character "T" is represented by a set of coordinates $$\begin{Bmatrix} x_{T_1}, y_{T_1}, z_{T_1} & x_{T_3}, y_{T_3}, z_{T_3} \\ x_{T_2}, y_{T_2}, z_{T_2} & x_{T_4}, y_{T_4}, z_{T_4} \end{Bmatrix},$$

where x, y is the coordinate of a pixel with respect to the frame coordinate system 602 and z is a time corresponding to that pixel. For instance, the coordinates $\{x_{T_1},y_{T_1},z_{T_1}\}$, $\{x_{T_2},y_{T_2},z_{T_2}\}$, {x_(T_3), y_(T_3), z_(T_3)}, and $\{x_{T_4},y_{T_4},z_{T_4}\}$ may respectively correspond to the bottom left pixel, the bottom right pixel, the top left pixel, and the top right pixel bounding the character "T" in association with respective times. Similarly, the character "h" is represented by a set of coordinates $$\begin{Bmatrix} x_{h_1}, y_{h_1}, z_{h_1} & x_{h_3}, y_{h_3}, z_{h_3} \\ x_{h_2}, y_{h_2}, z_{h_2} & x_{h_4}, y_{h_4}, z_{h_4} \end{Bmatrix},$$

where the coordinates $\{x_{h_1},y_{h_1},z_{h_1}\}$, $\{x_{h_2},y_{h_2},z_{h_2}\}$, {x_(h_3), y_(h_3), z_(h_3)}, and $\{x_{h_4},y_{h_4},z_{h_4}\}$ may respectively correspond to the bottom left pixel, the bottom right pixel, the top left pixel, and the top right pixel bounding the character "h" in association with respective times.

As further shown in FIG. 7, the data structure 700 includes an indication of the detected object 307 (e.g., the candidate image extracted from Frame(K) 410). In an example, the data structure 700 may store the detected object 307 using an object notation that can be referenced as a set of coordinates for the detected object 307. As shown, the spatial information 309 overlaid with timing information 308 for the object 307 is represented by a set of coordinates $$\begin{Bmatrix} x_{obj_1}, y_{obj_1}, z_{obj_1} & x_{obj_3}, y_{obj_3}, z_{obj_3} \\ x_{obj_2}, y_{obj_2}, z_{obj_2} & x_{obj_4}, y_{obj_4}, z_{obj_4} \end{Bmatrix},$$

where the coordinates $\{x_{obj_1},y_{obj_1},z_{obj_1}\}$, $\{x_{obj_2},y_{obj_2},z_{obj_2}\}$, {x_(obj_3), y_(obj_3), z_(obj_3)}, and $\{x_{obj_4},y_{obj_4}, z_{obj_4}\}$ may respectively correspond to the bottom left pixel, the bottom right pixel, the top left pixel, and the top right pixel bounding the object 307 in association with respective times. In some examples, the data structure 700 may also include multiple sets of coordinates for each character in the text 304 and/or object 307, for example, including a first set with timing calculated with respect to the frame timeline 404, a second set with timing calculated with respect to the audio timeline 402, and a third set with timing calculated with respect to the video timeline 406. The data structure 700 may also include a size for each of the characters in the text 304 and/or each of the detected object(s) 307. The size may be a percentage size with respect to the size of a respective frame in which the character or the object 307 is detected as discussed above.

In some embodiments, the categorization engine 138 may add, to the metadata 142, additional information determined from the audio analysis 320 and/or the frame analysis 350. Some examples of additional information may include, but are not limited to, amplitude and frequency values per audio sample (e.g., in units bit rate (BR)), audio amplitude values association per millisecond, audio frequency value association per millisecond, audio level (e.g., in units of decibels (dB)), frame entropy values per frame, frame to time association (e.g., a start time and/or an end time of each frame), and/or identification of black frames and correlation to audio amplitude and frequency based on association of timing.

Figure 8:
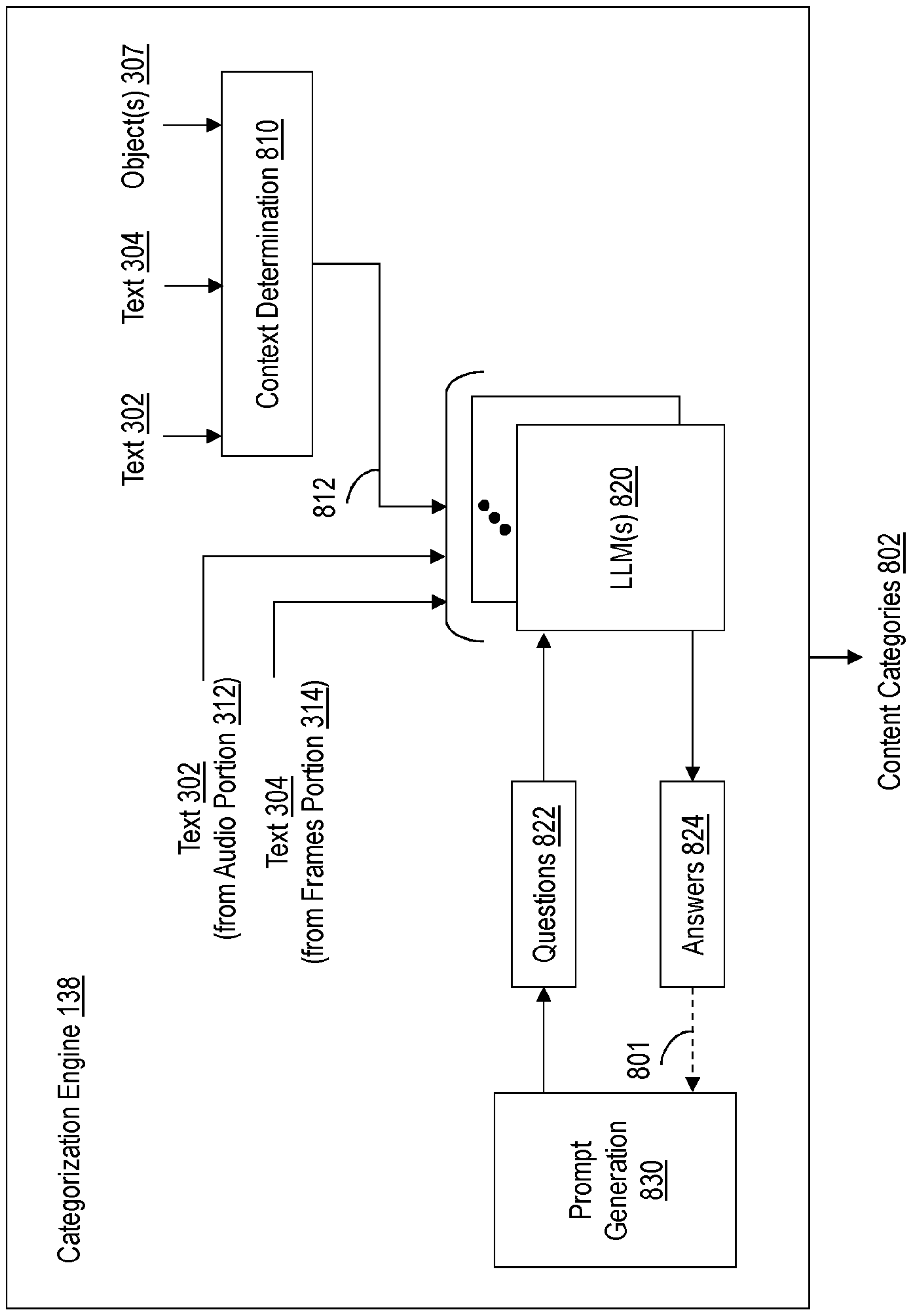
FIG. 8 is a block diagram illustrating components and/or operations for content categorization according to an embodiment of the disclosure.

Turning now to FIG. 8, components and/or operations for content categorization are described. After the audio analysis 320 and the frames analysis 350 are performed, the categorization engine 138 may perform text-to-inference to determine one or more categories 802 associated with the content item 112-1. As shown, the categorization engine 138 may further include a context determination component 810, one or more LLMs 820, and a prompt generation component 830.

In an example, the categorization engine 138 may feed an LLM 820 the entire narrative of the text 302 (from the audio portion 312) without the timing information 303 or the audio markers (the start time markers 408 and the end time markers 409). The categorization engine 138 may input particular prompts or deterministic questions 822 to the LLM 820 for the LLM 820 to provide answers 824 using the narrative of the text 302. Some examples of deterministic questions 822 may include, but are not limited to, "Is this politically related?", "What are the names mentioned?", "Is a candidate mentioned?", "Which office is the candidate running for?", "Is a brand present?", "Which brand?", "Is there a drug mentioned?", "Is there a logo?", etc.).

Some examples of content categories 802 may include, but are not limited to, politics, healthcare, pharmaceutical, CBD, alcohol, adult content, gun, or gambling. In general, the categorization engine 138 may input, to an LLM 820, a series of questions 822 that are determined specifically for each category 802 and corresponding answers 824 that the categorization engine 138 may use to determine the one or more categories 802 of the content item 112-1. For instance, the prompt generation component 830 may generate prompts or deterministic questions 822 that are designed specifically for certain content categories 802. As an example, to determine whether the content item 112-1 may be categorized under politics, the prompt generation component 830 may generate the following series of questions 822 for input to the LLM 820:

What are the topics defined in the data provided?
Are there politically related topics identified in the topics identified?
What are the political related topics identified in the topics identified?
Are there any profane words?
What are the profane words?
What is the context of the words used in?
Based on the context, are the words directed at a specific person or party?
Who is the candidate identified?
What organizations are identified?
What is the sponsorship message?

Is the sponsorship of the message from a person?

Is the sponsorship of the message from an organization or an entity?

The sequencing of questions 822 may correlate to the precision and/or accuracy of the answers 824 that are provided by an LLM 820. For example, if the content item 112-1 is a pharmaceutical advertisement, and the advertisement begins with "This is John, John is sad, John then takes this drug, and this drug makes him feel happy . . . dopamine-drug is a pill by the maker of company-pharma". If a question 822 to the LLM 820 is stated as: "Who is the sponsor?", the LLM 820 may likely provide the answer 824 as "John". If, however, the question 822 is designed (or engineered) to deduce a more accurate answer 824, then the LLM 820 may provide the answer 824 as: "company-pharma". In some examples, the prompt generation component 830 can be outside of the categorization engine 138, and the categorization engine 138 may provide a question interface to communicate with the prompt generation component 830.

In general, there may be more than one pass through the LLM 820 to input additional prompts or deterministic questions 822, for example, based on the outputs of the LLM 820 to the initial set of prompts or deterministic questions 822. For instance, the prompt generation component 830 may generate a first question 822 for input to an LLM 820. The LLM 820 may generate a first answer 824 for the first question 822 using the text 302. Subsequently, the prompt generation component 830 may generate a second question 822 for input to the LLM 820. The LLM 820 may generate a second answer 824 for the second question 822 using the text 302. In some instances, the first answer 824 to the first question 822 may be fed back to the prompt generation component 830, and the second question 822 may be generated based on the first answer 824 as shown by the dashed arrow 801.

In some embodiments, multiple LLMs 820 are used for the text-to-inference determinations to allow for better precision. Different prompts or deterministic questions 822 may be inputted to different LLMs 820. For instance, a first LLM 820 may generate a first answer 824 for a first question 822 using the text 302. Subsequently, a second question 822 may be fed to a second LLM 820 different than the first LLM 820, and the second LLM 820 may generate a second answer 824 for the second question 822 using the text 302.

Similarly, the categorization engine 138 may utilize at least one LLM 820 to generate an answer indicating one or more categories 802 for the content item 112-1 in response to one or more questions 822 using the text 304 (from the frames portion 314). In some instances, the same LLM 820 may be fed with the text 302 and the second text 304 separately or jointly for text-to-inference. In other instances, one LLM 820 may be fed with the first text 302 for text-to-inference and another LLM 820 may be fed with the text 304 for text-to-inference. In some instances, an inference based on the text 302 may indicate the same content category 802 as an inference based on the text 304. In other instances, an inference based on the text 302 may indicate a different content category 802 than an inference based on the text 304 (e.g., when the content item 112-1 is associated with more than one category 802).

In an embodiment, as part of determining the one or more categories 802 for the content item 112-1, the context determination component 810 may further determine a subject matter (or topic) related to the text 302 from the audio portion 312 and determine a frequency of appearance of the text 304 and/or the object(s) 307 (e.g., images of guns or mentions of guns as text 304 in the frames 410) from the frames portion 314. Based on the subject matter and the frequency of appearance of the text 304 and/or the object(s) 307, the categorization engine 138 may determine contextual information 812 of the content item 112-1. Some examples of contextual information 812 may include, but are not limited to, sentiments (e.g., happy, sad, angry, etc.), themes (e.g., sports game, concerts, parties, election campaign), target audiences (e.g., children, youth, elderly, musicians, teachers, etc.). As part of determining the one or more categories 802 of the content item 112-1, the categorization engine 138 may further feed the contextual information 812 along with the text 302 and/or the text 304 to an LLM 820 for the LLM 820 to further use the contextual information 812 to provide answers 824 for the one or more questions 822. In general, to determine the one or more categories 802 of the content item 112-1, the categorization engine 138 may utilize one or more LLMs 820 to generate, using the text 302 (from the audio portion 312), the text 304 (from the frames portion 314), and/or the contextual information 812, a response to one or more questions 822.

FIGS. 3 and 8 are merely an example of components of a categorization engine, and variations are contemplated to be within the scope of the present disclosure. In embodiments, the categorization engine may include other components not illustrated in FIGS. 3 and 8. In embodiments, the categorization engine may not include every component illustrated in FIGS. 3 and 8. In embodiments, the components and connections may be implemented with different connections than those illustrated in FIGS. 3 and 8. Such and other embodiments are contemplated to be within the scope of the present disclosure.

Figure 9:
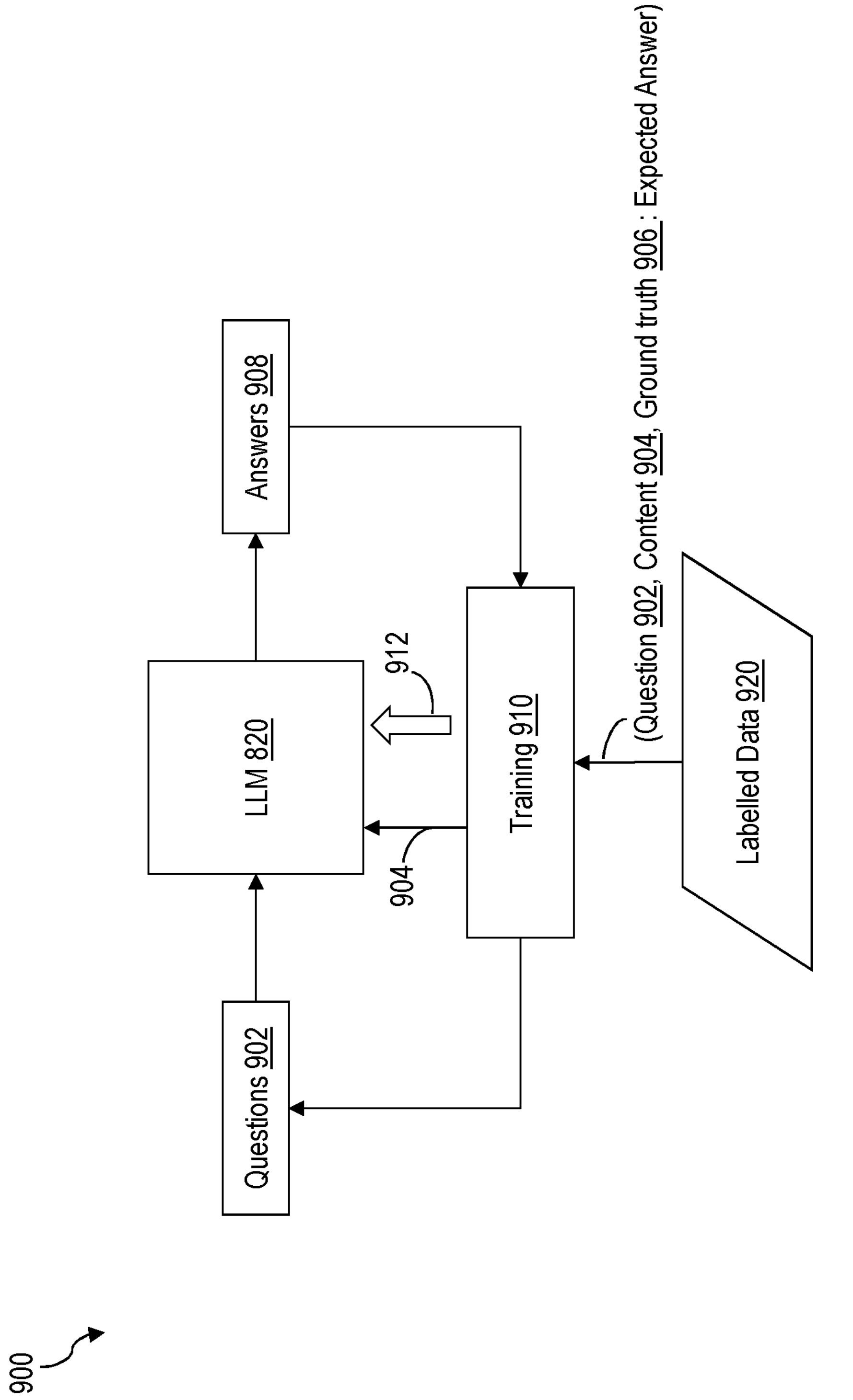
FIG. 9 is a block diagram illustrating a method for training a large language model (LLM) for content categorization according to an embodiment of the disclosure.

Turning now to FIG. 9, a method 900 for training an LLM 820 is described. The LLM 820 may be trained using labelled data 920. The labelled data 920 may include multiple datasets, each including a content 904, which may be texts (e.g., the text 302 and the text 304) or images of objects (e.g., the objects 307), a question 902 that can lead to an indication of a category of the content 904, and a ground truth 906, which is the expected answer for the question 902 based on the content 904. That is, the LLM 820 is trained to provide an answer 908 that matches the ground truth 906 when given the corresponding question 902.

In an example, the LLM 820 may be a deep learning model or a ML model with model weights that can be trained to provide answers 824 to questions 822 using certain content. To train the LLM 820, the training component 910 (e.g., stored in non-transitory memory of the computer system 130) may feed the LLM 820 with a content 904 and a question 902 from a first dataset. The LLM 820 may output an answer 908 to the question 902 using the content 904. The training component 910 may compare the answer 908 output by the LLM 820 against the ground truth 906. The training component 910 may update the model weights of the LLM 820 based on an error determined from the comparison as shown by 912. The process of feeding the LLM 820 with a question 902 and corresponding content 904, comparing an answer 908 output by the LLM 820 with a corresponding ground truth 906, and updating the model weights of the LLM 820 may be iterated until the error from the comparison satisfies certain criteria. The training component 910 may also step through all the dataset in the labelled data 920.

In some examples, different LLMs 820 may be trained to identify different content categories. For instance, one LLM 820 may be trained to identify politically related content, and another LLM 820 may be trained to identify alcohol related content. In other examples, one LLM 820 may be trained to identify more than one content category (e.g., drug-related and alcohol related).

Figure 10:
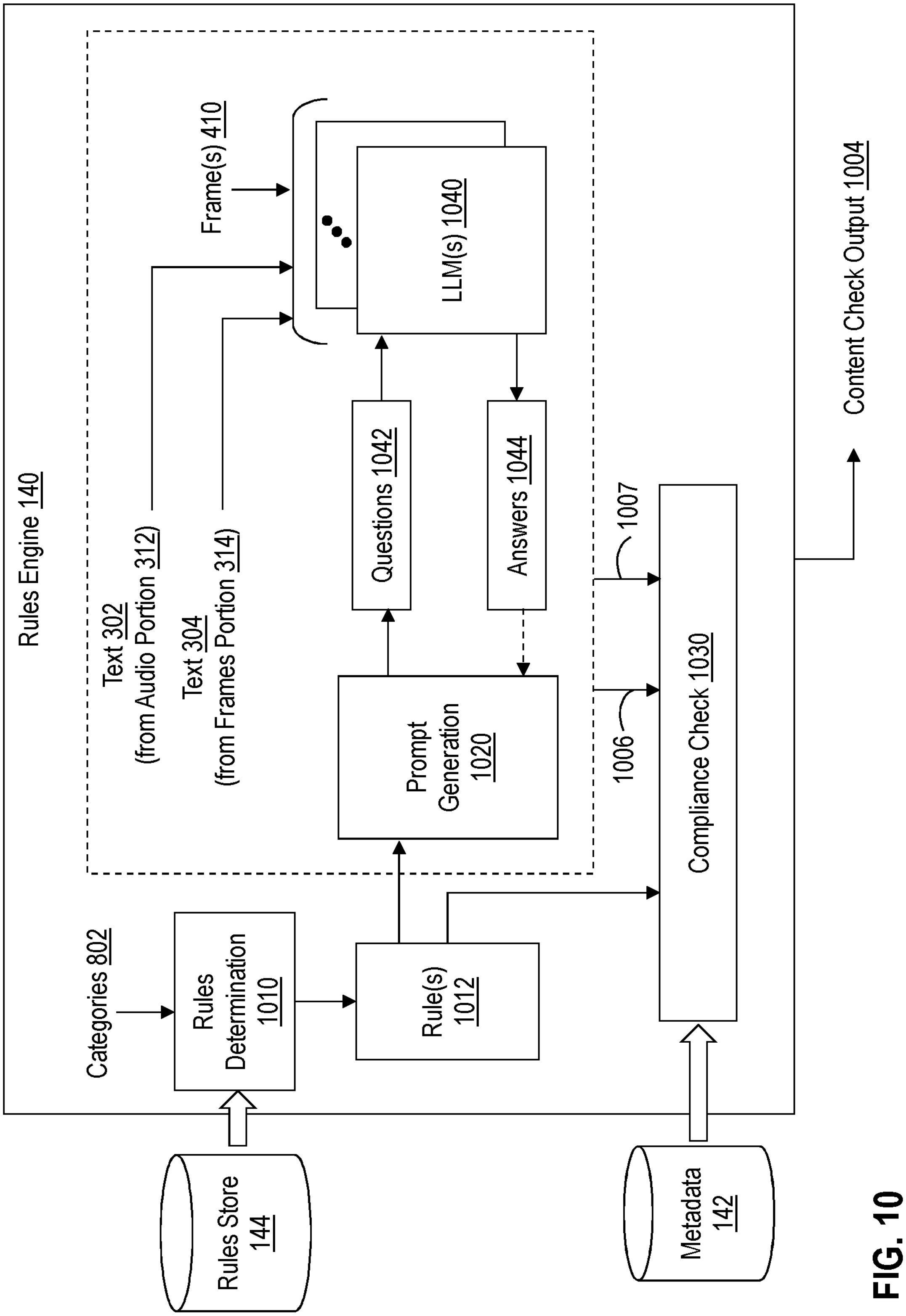
FIG. 10 is a block diagram illustrating components and/or operations for applications of rules according to an embodiment of the disclosure.

Turning now to FIG. 10, components and/or operations for applications of rules application are described. After the one or more categories 802 are determined for the content item 112-1, the rules engine 140 selects and applies rule(s) according to the determined one or more categories 802 of the content item 112-1. For instance, the rules engine 140 may include a rules determination component 1010, a prompt generation component 1020, a compliance check component 1030, and one or more LLMs 1040. The rules determination component 1010 may select rules 1012 from the rules store 144 based on the determined one or more categories 802 of the content item 112-1. In some examples, the rules 1012 may be selected further according to a policy of the customer and/or a regulation (e.g., FEC when the content item 112-1 is related to advertising an election campaign). In some examples, one or more of the rules 1012 may be adjusted based on a policy of the customer. For instance, the customer may have a more stringent or relaxed policy than a certain standard or regulation, and thus the rules determination component 1010 may adjust certain thresholds accordingly. In some examples, the rules determination component 1010 may select some rules 1012 from the rules store 144 and generate one or more of the rules 1012 based on the customer policy.

In an embodiment, the selected rules 1012 may regulate the timings and/or the sizing of certain texts in the content item 112-1. For instance, the selected rules 1012 may specify an earliest start time, a latest start time, an earliest end time, and/or a latest end time for a specific message (e.g., a sponsorship message or a disclaimer message) within certain content and/or a threshold duration or a range of duration for the specific message. Similarly, the selected rules 1012 may specify an earliest start time, a latest start time, an earliest end time, and/or a latest end time for a specific object (e.g., an election candidate facial image) within certain content and/or a threshold duration or a range of duration for the specific object.

To apply the rules 1012, the rules engine 140 may utilize the LLM 1040 to locate the specific message in the text 302 (from the audio portion 312) and/or the text 304 (from the frames portion 314). The rules engine 140 may input particular prompts or deterministic questions 1042 (e.g., "Is there a sponsorship message?", "What is the sponsorship message?", etc.) to the LLM 1040. The prompts or deterministic questions 1042 may vary depending on the specific message 1006 of interest. Similar to the prompt generation component 830 for content categorization, the prompt generation component 1020 may generate prompts or questions 1042 for input to the LLM 1040. In general, there may be more than one pass through the LLM 1040 to input additional prompts or deterministic questions 1042, for example, based on the outputs of the LLM 1040 to the initial set of prompts or deterministic questions 1042. For instance, the prompt generation component 1020 may generate a first question 1042 for input to an LLM 1040. The LLM 1040 may generate a first answer 1044 for the first question 1042 using the rules 1012. Subsequently, the prompt generation component 1020 may generate a second question 1042 for input to the LLM 1040. The LLM 1040 may generate a second answer 1044 for the second question 1042 using the rules 1012. In some instances, the first answer 1044 to the first question 1042 may be fed back to the prompt generation component 1020, and the second question 1042 may be generated based on the first answer 1044 as shown by the dashed arrow.

The rules engine 140 may provide the specific message 1006 identified (or located) by the LLM 1040 to the compliance check component 1030. As an example, the text 302 (from the audio portion 312) may include multiple sentences, and the LLM 1040 may locate the specific message 1006 in one or more of the sentences. As another example, the text 304 (from the frames portion 314) may include multiple sentences in one or more frames 410, and the LLM 1040 may locate the specific message 1006 in a certain frame. Referring to the example Frame(K) shown in FIG. 6, the text 304 may include the statement "This advertisement was paid for . . . " and "Vote for . . . ". The specific message 1006 may be "This advertisement was paid for . . . ".

In some examples, multiple LLMs 1040 may be used to locate the specific message 1006 or the specific object 1007. In some examples, the LLM 1040 may be trained using similar mechanisms as discussed above with reference to FIG. 9. In some examples, different LLMs 1040 may be trained to locate different types of messages or objects. For instance, one LLM 1040 may be trained to locate messages related to politics, and another LLM 1040 may be trained to locate messages related to guns.

The compliance check component 1030 may confirm the size, the location, and/or timings of the specific message 1006 to determine whether the rules 1012 that pertain to the one or more determined categories 802 are satisfied and output a content check output 1004. As discussed above, the metadata 142 may include a start time and/or an end time for each word extracted from the audio portion 312 (e.g., the data structure 500 of FIG. 5) and a start time, an end time, pixel coordinates, and/or size for each textual character and/or each object detected from the frames portion 314 (e.g., the data structure 700 of FIG. 7). Thus, the compliance check component 1030 may obtain information about the size, the location, and/or the timings of the specific message 1006 from the metadata 142.

Similarly, the rules engine 140 may utilize the LLM 1040 to locate a specific object in a frame 410. For instance, the LLM 1040 may be trained to perform inference from images (e.g., including object and/or facial recognition). The rules engine 140 categorization engine 138 may input particular prompts or deterministic questions 1042 (e.g., "Is there a candidate image?", "Is the candidate XXX.YYY?", etc.) to the LLM 1040. The rules engine 140 may provide an indication of the specific object 1007 identified by the LLM 1040 to the compliance check component 1030. For instance, the indication may be an object notation in a text-based format. The compliance check component 1030 may confirm the size, the location, and/or timings of the specific object 1007 to determine whether or not the rules 1012 that pertain to the one or more determined categories 802 are satisfied and output a content check output 1004.

In an embodiment, as part of applying the rules, the rules engine 140 may determine whether the text 302 from the audio portion 312 includes a specific message 1006 required by the rules 1012 and whether timing of the specific message 1006 satisfies the rules 1012. For instance, the rules engine 140 may identify (or locate) a specific message 1006 within the text 302 extracted from the audio portion 312 using at least one LLM 1040 to generate, using the text 302, a response (the answer 1044) to one or more questions 1042 associated with the specific message 1006. As discussed above, the timing information 303 may include a start time and an end time for each word in the text 302. Thus, rules engine 140 may further determine, based on the timing information 303 associated with the text 302, at least one of a start time, a duration, an end time, or a speech rate associated with the specific message 1006. For instance, the rules engine 140 may search for the specific message 1006 in the text 302 and obtain the start time of the beginning word in the specific message 1006 and obtain the end time of the last word in the specific message 1006. The rules engine 140 may further determine whether the at least one of the start time, the duration, the end time, or the speech rate associated with the specific message 1006 satisfies a threshold (e.g., an earliest start time, a latest end time, a threshold duration) in one or more of the rules 1012.

Additionally or alternatively, the rules engine 140 may determine whether the text 304 from the frames portion 314 includes a specific message 1006 required by the rules 1012 and whether character sizing in the specific message 1006 satisfies the rules 1012. For instance, the rules engine 140 may identify (or locate) the specific message 1006 within the text 304 extracted from the frames portion 314 using at least one LLM 1040 to generate, using the text 304, a response (the answer 1044) to one or more questions 1042 associated with the specific message 1006. As discussed above, the spatial information 306 may include a percentage size for each textual character in the text 304. Thus, the rules engine 140 may further determine, based on the spatial information 306 associated with the text 304, a size of an individual textual character in the specific message 1006 with respect to a size of an individual frame 410 of the set of frames 410. The rules engine 140 may further determine whether the size of the individual textual character in the specific message 1006 satisfies a threshold (e.g., a threshold percentage size, height, width) in one or more of the rules 1012.

Additionally or alternatively, the rules engine 140 may determine whether the text 304 from the frames portion 314 includes a specific message 1006 required by the rules 1012 and whether timing of the specific message 1006 satisfies the rules 1012. For instance, the rules engine 140 may determines, based on the timing information 305 associated with the text 304, whether the at least one of a start time, an end time, or a duration associated with the specific message 1006 located from the text 304 satisfies a threshold (e.g., an earliest start time, a latest end time, a threshold duration) in one or more of the rules 1012. For instance, as discussed above, the timing information 305 may include a start time and an end time for each textual character in the text 304. Thus, rules engine 140 may further determine, based on the timing information 305 associated with the text 304, at least one of a start time or an end time a duration associated with the specific message 1006 in the text 304. For instance, the rules engine 140 may search for the specific message 1006 in the text 304 and obtain the start time of the beginning character of the beginning word in the specific message 1006 and obtain the end time of the last character of the last word in the specific message 1006.

As an example, the content item 112-1 is a candidate advertisement for an election campaign. The rules 1012 may specify that the candidate needs to be in the advertisement saying a disclaimer message (e.g., "I am XXX YYY and I approve this message"), the candidate's face needs to cover 80% of the height of the screen, and the speech rate needs to be less that K words/minute. Thus, the rules engine 140 may first recognize whether an object in the frames portion 314 of the content item 112-1 is a person's face. If so, the rules engine 140 may use facial recognition to determine whether the person's face corresponds to the candidate XXX YYY. In an example, the LLM 1040 may be trained to perform inference from images (e.g., including facial recognition). If the candidate XXX YYY's face is confirmed to be in the frames portion 314, the compliance check component 1030 may determine whether the size (e.g., obtained from the metadata 142) of the object covers 80% of the height of the frame. The rules engine 140 may locate the disclaimer message (a specific message 1006) from the audio portion 312. The compliance check component 1030 may determine the start time and end time of the disclaimer message in the audio portion 312 (e.g., obtained from the metadata 142) to determine whether the disclaimer message in the audio portion 312 is within the same frames as the candidate image. The rules 1012 may further specify that the disclaimer message and the candidate image need to start 4 seconds prior to the end of the content item 112-1. Thus, the compliance check component 1030 may determine whether the start time of the disclaimer message in the audio portion 312 (e.g., obtained from the metadata 142) is 4 seconds prior to the end of the content item 112-1.

Additionally or alternatively, the rules engine 140 may determine whether the frames portion 314 includes a specific object 1007 required by the rules 1012 and whether sizing of the specific object 1007 satisfies the rules 1012. For instance, the rules engine 140 may identify (or locate) the object 1007 from a frame 410 in the frames portion 314 using at least one LLM 1040 to generate, using the frame 410, a response (the answer 1044) to one or more questions 1042 associated with the specific object 1007. As discussed above, the spatial information 309 may include a percentage size for each object 307 in a frame 410. Thus, the rules engine 140 may further determine, based on the spatial information 309 associated with the object 307, a size of the specific object 1007 with respect to a size of an individual frame 410 of the set of frames 410. The rules engine 140 may further determine whether the size of the specific object 1007 satisfies a threshold (e.g., a threshold percentage size, height, width) in one or more of the rules 1012.

Figure 11:
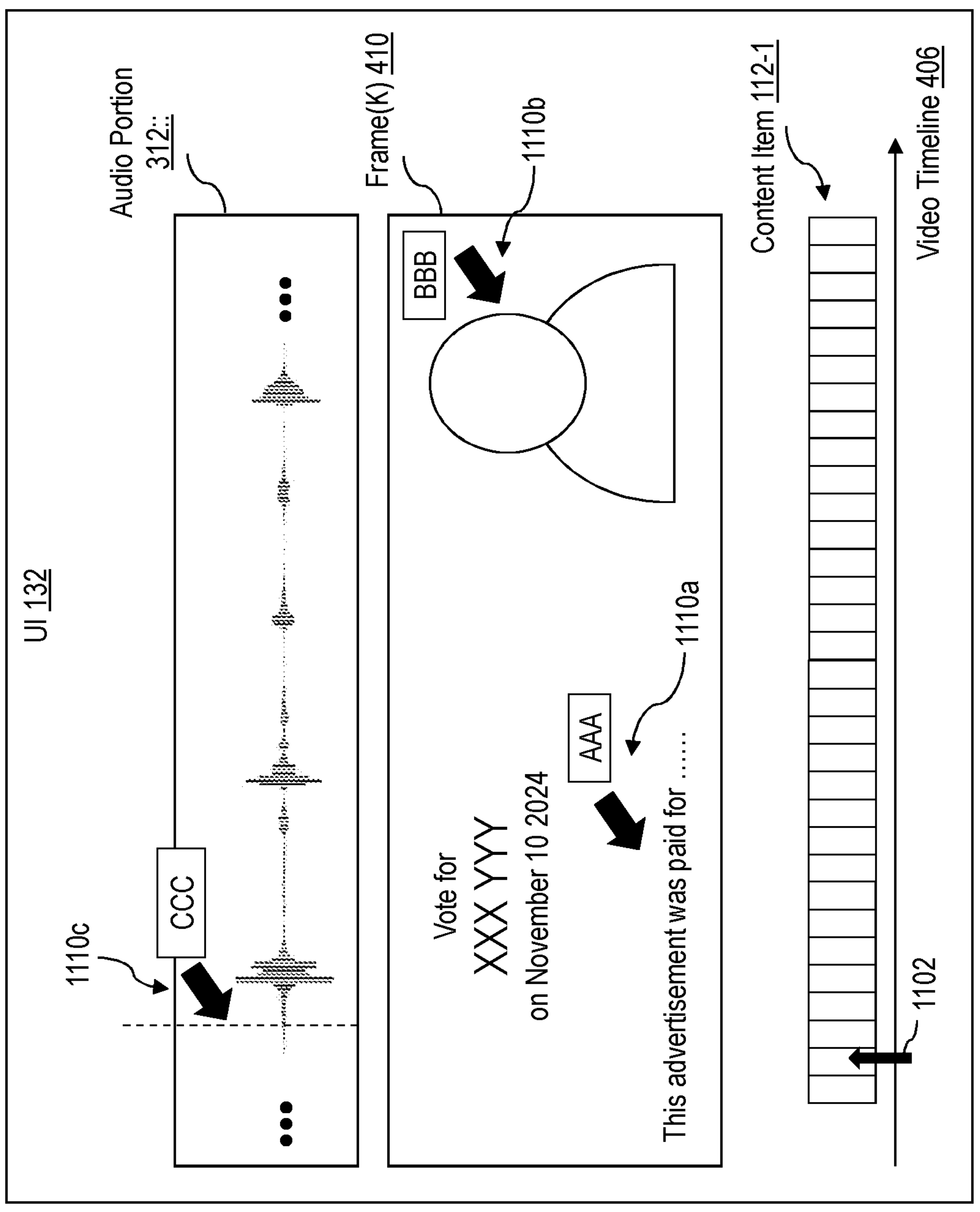
FIG. 11 is a block diagram illustrating an example content check output presentation according to an embodiment of the disclosure.
Figure 12:
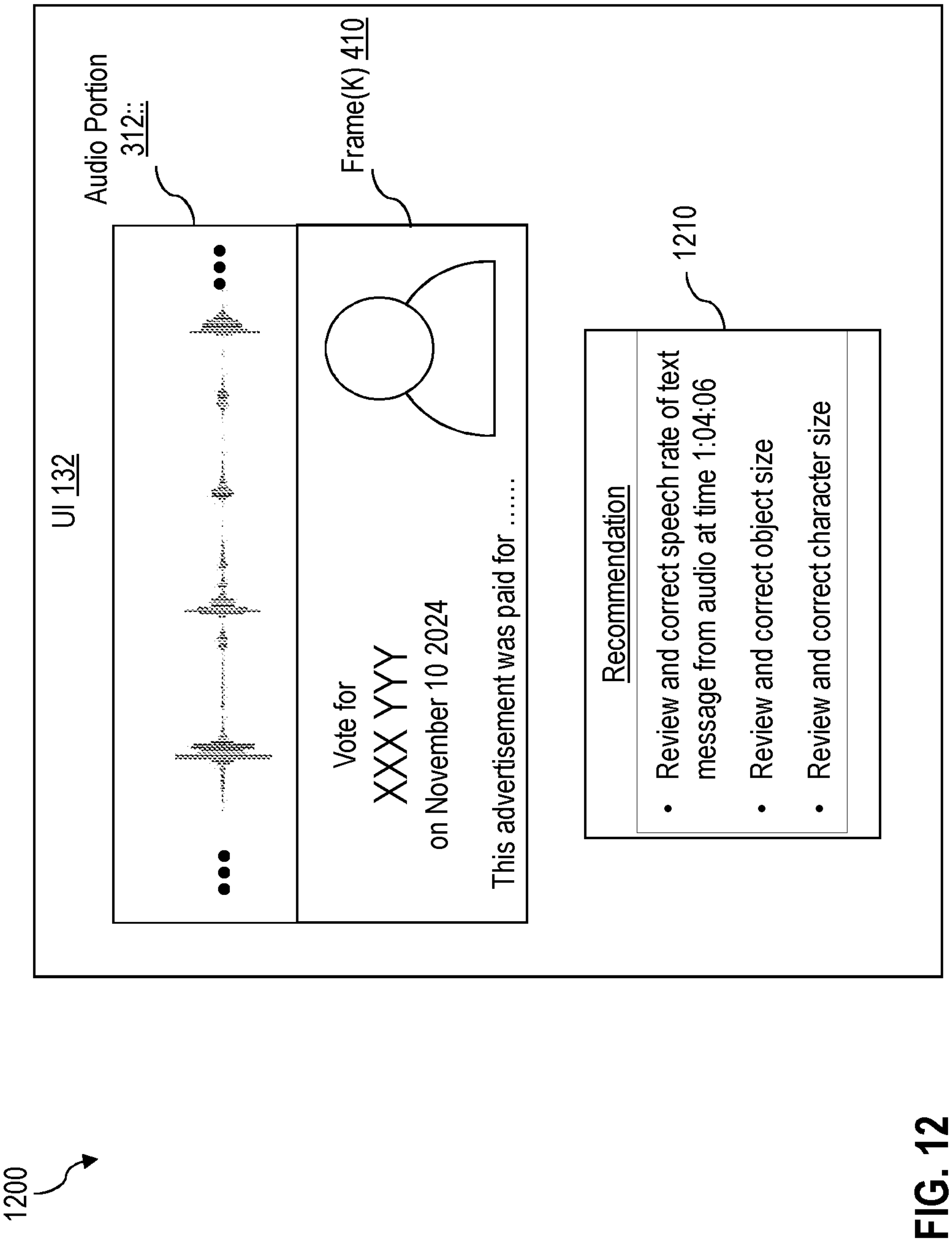
FIG. 12 is a block diagram illustrating an example content check output presentation according to an embodiment of the disclosure.
Figure 13:
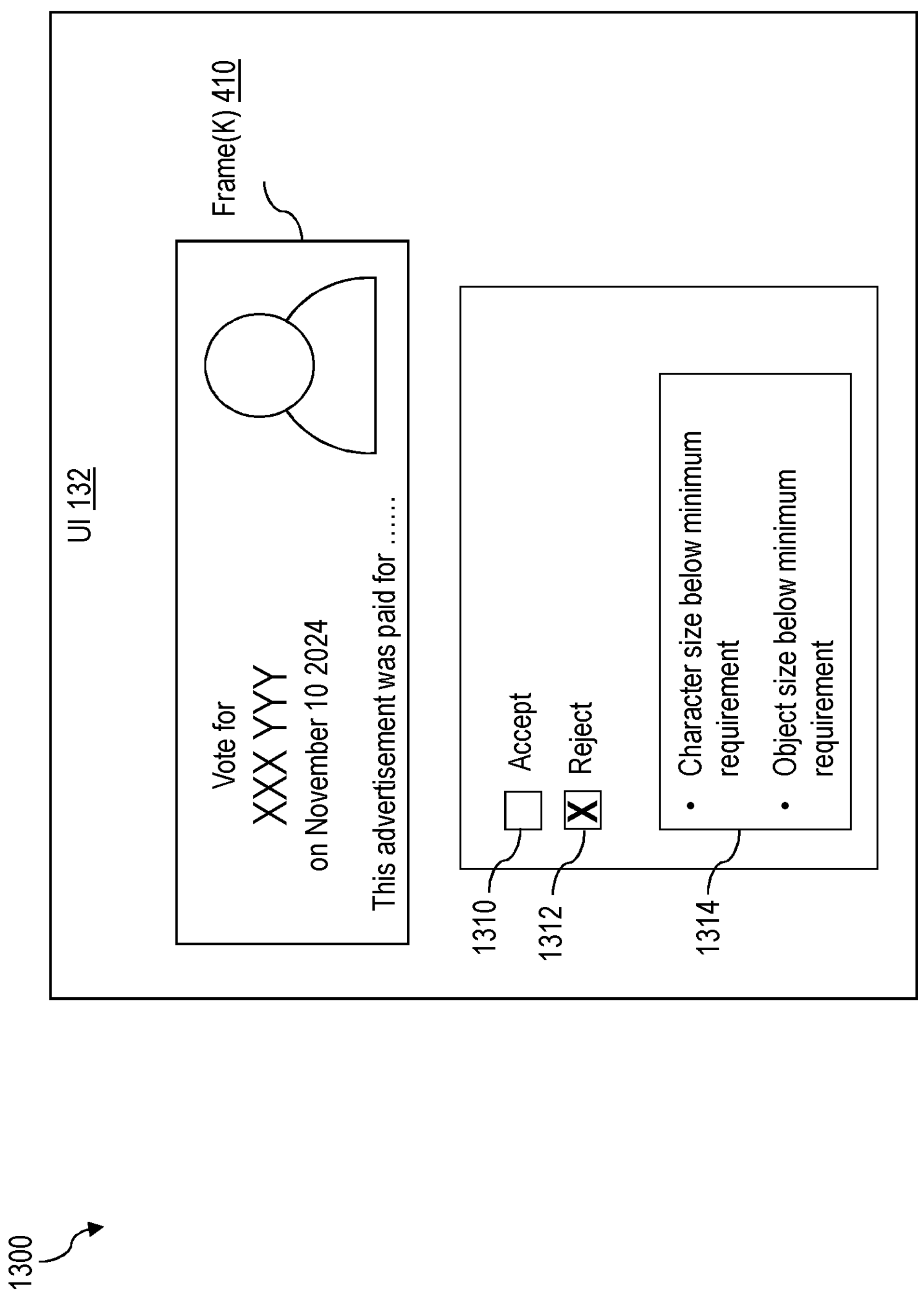
FIG. 13 is a block diagram illustrating an example content check output presentation according to an embodiment of the disclosure.

Based on the application of the rules 1012, the presentation component 146 may present a result (e.g., the content check output 1004) from the application of the rules 1012 to the customer in a variety of ways, for example, as shown in FIGS. 11-13. FIGS. 11-13 are discussed using the example Frame(K) illustrated in FIG. 6.

FIG. 10 is merely an example of components of a rules engine, and variations are contemplated to be within the scope of the present disclosure. In embodiments, the rules engine may include other components not illustrated in FIG. 10. In embodiments, the rules engine may not include every component illustrated in FIG. 10. In embodiments, the components and connections may be implemented with different connections than those illustrated in FIG. 10. Such and other embodiments are contemplated to be within the scope of the present disclosure.

Turning now to FIG. 11, an example of a content check output presentation 1100 is described. For instance, the content check output 1004 may indicate that the size of the object 307, the size of the second text 304, and the start time of the first text 302 fails to satisfy the rules 1012. To present the issues identified from the application of the rules 1012, the presentation component 146 may generate and display, via the UI 132, at least a portion of the content item 112-1 (e.g., Frame(K) 410 that has the issue) with an overlay including an indicator 1110 indicating the issue in the portion of the content item 112-1. For example, the indicator 1110 may include a pointer, an arrow, and/or a ruler to illustrate an issue with the size of a message or an object. In the illustrated example of FIG. 11, an indicator 1110*a* in the form of an arrow and texts (shown by the box "AAA") may indicate that the second text 304 fails to meet the size requirement (e.g., exceeds a maximum size or below a minimum size), an indicator 1110*b* in the form of an arrow and texts (shown by the box "BBB") may indicate that the object 307 fails to meet the size requirement (e.g., exceeds a maximum size or below a minimum size), and an indicator 1110*c* in the form of an arrow and texts (shown by the box "CCC") may indicate that the first text 304 fails to meet the time requirement (e.g., too early or too late). In some embodiments, the presentation component 146 may also present, via the UI 132, the entire content item 112-1 with an overlaid indicator 1102 to allow the customer to jump to specific portion (Frame(K)) of the content item 112-1 with the issue.

Turning now to FIG. 12, an example of a content check output presentation 1200 is described. For instance, the content check output 1004 may indicate that the size of the object 307, the size of the second text 304, and the speech rate of the first text 302 fails to satisfy the rules 1012. To present the issues identified from the application of the rules 1012, the presentation component 146 may generate and display, via the UI 132, a recommendation 1210 to correct the issues in the content item 112-1. The recommendation 1210 may be presented along with the portion of the content item 112-1 that has the issues. In other examples, the presentation component 146 may output the recommendation in a report format.

In an embodiment, the action component 148 may approve or reject the content item 112-1 based on the application of the rules 1012, and the presentation component 146 may output (e.g., via the UI 132) an indication of whether the content item 112-1 is accepted (i.e., a compliance pass) or rejected (e.g., a compliance failure). If the action component 148 rejected the content item 112-1, the action component 148 may further provide reason(s) of the rejection, and the presentation component 146 may also indicate the reason(s) for the rejection. In some instances, the acceptance or rejection may be based on a policy of the customer. For example, one customer may have strict standards regarding whether the content 112-1 passes or fails (e.g., the content item 112-1 must pass all of the rules 1012) while another customer may have more relaxed standards (e.g., the content item must pass a certain number of rules 1012, but not all the rules 1012, or the content item 112-1 must pass certain rules 1012 and other rules 1012 can be failed, etc.).

Turning now to FIG. 13, an example of a content check output presentation 1300 is described. In an embodiment, the presentation component 146 may output an indication of whether the content item 112-1 is accepted or rejected. For instance, the action component 148 may approve or reject the content item 112 based on the application of the rules 1012, and the presentation component 146 may output (e.g., via the UI 132) an indication of whether the content item 112 is accepted (i.e., a compliance pass) or rejected (e.g., a compliance failure). If the action component 148 rejected the content item 112-1, the action component 148 may further provide reason(s) of the rejection, and the presentation component 146 may also indicate the reason(s) for the rejection.

In the illustrated example of FIG. 13, the action component 148 rejects the content item 112-1 because of the size of the character and the size of the object in Frame(K) 410 fails to meet the minimum requirement. As shown, the UI 132 may include a checkbox 1310 for accept, a checkbox 1312 for reject, and display panel 1314. The checkbox 1312 is checked to show the rejection of the content item 112-1 and the reason(s) for rejection are shown in the display panel 1314. The UI 132 may also display the portion of the content item 112-1 (e.g., Frame(K) 410) that causes the rejection. In other examples, the presentation component 146 may output the accept, reject, and/or reason(s) for rejection in a report format.

In some embodiments, the action component 148 may also fact check factual statements in the content item 112-1, identify sources consistent and/or inconsistent with the factual statements, and present those sources to the customer via the UI 132 (e.g., included as part of the presentation 1100, 1200, and/or 1300 of FIGS. 11, 12, and/or 13 respectively).

In some embodiments, the action component 148 may correct or fix issue(s) in the content item 112-1 indicated by the rules application as discussed above with reference to FIG. 10. Once the issue(s) with the content item 112-1 are corrected, the corrected content item may be provided back to the content check system 130 to allow the content check system 130 to process the content item 112-1 as described above. Stated differently, the content check system 130 may receive an updated content item 112 in response to an indication of an issue in a previous content item 112. The content check system 130 may check the updated content item 112 for compliance with rules as discussed above. If there is still an issue in the updated content item 112, the content check system 130 may modify updated content item 112 to correct the issue. If, however, there is no more issue the updated content item 112, the content check system 130 may provide the updated content item 112 to a respective content delivery system 110 for delivery or streaming. As an example, the issues may be related to the audio amplitude levels and/or audio level range failing to meet a certain threshold, and thus the action component 148 may adjust the signal amplitudes of the audio portion 312 as part of the correction. As another example, similar to the amplitude issue, if there is no amplitude detected, the action component 148 may highlight the areas where there is no audio amplitude detected.

Figure 14:
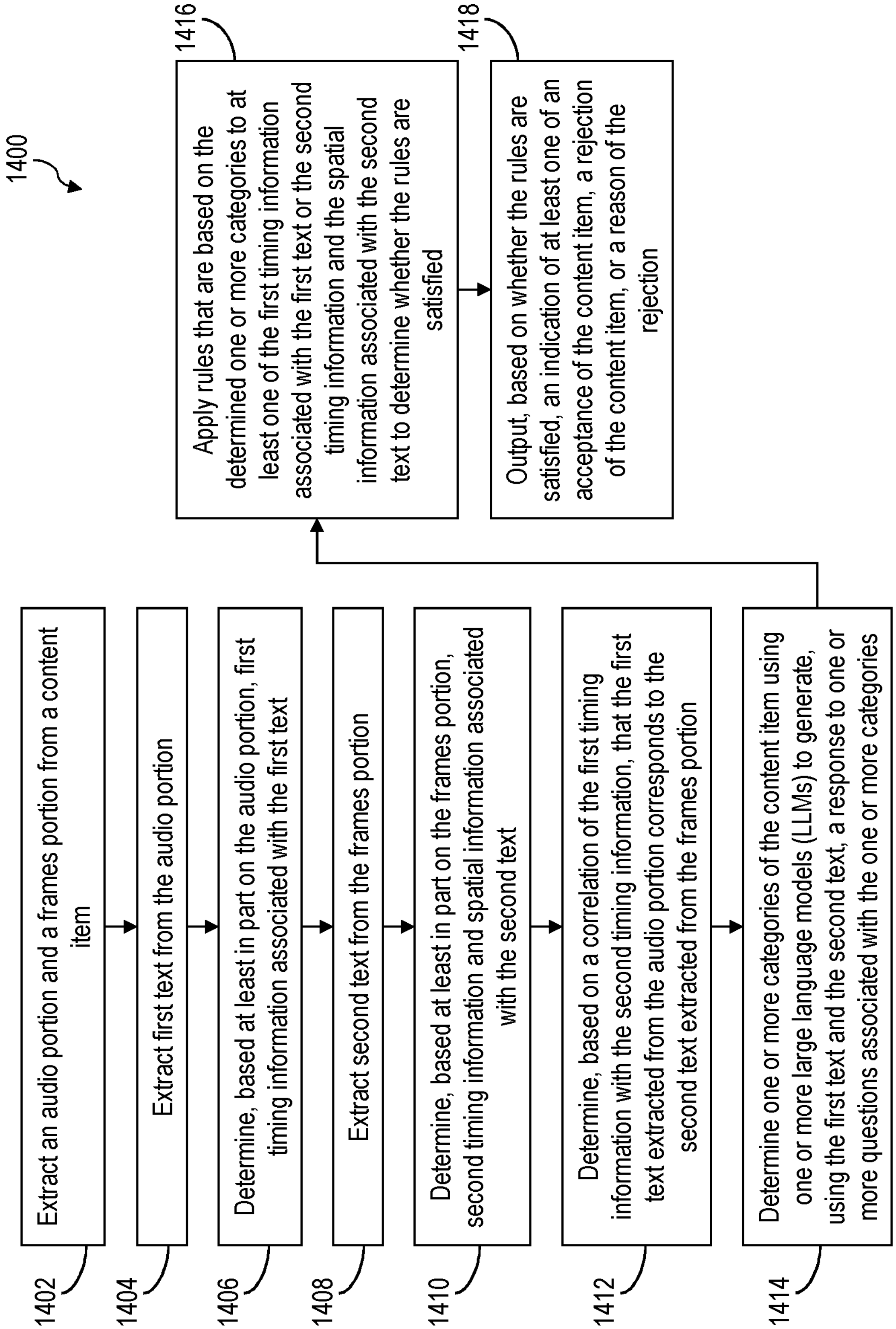
FIG. 14 is a flow chart of a content check method according to an embodiment of the disclosure.

Turning now to FIG. 14, a content check method 1400 is described. The method 1400 may use similar mechanisms as discussed above with reference to FIGS. 1-12. At block 1402, a categorization engine 138 stored in non-transitory memory of a computer system 130 and executable by a processor of the computer system 130, extracts an audio portion 312 and a frames portion 314 from a content item 112, where the frames portion 314 includes a set of frames 410.

At block 1404, the categorization engine 138 extracts first text 302 from the audio portion 312. In embodiments, as part of extracting the first text 302, the categorization engine 138 detects, using a speech recognition model 324, speech from the audio portion 312 and converts, using a speech-to-text model 326, the detected speech into the first text 302.

At block 1406, the categorization engine 138 determines, based at least in part on the audio portion 312, first timing information 303 associated with the first text 302. In embodiments, the first timing information 303 associated with the first text 302 from the audio portion 312 includes at least one of a start time, an end time, or a duration of each of one or more words in the first text 302.

At block 1408, the categorization engine 138 extracts second text 304 from the frames portion 314. In embodiments, as part of extracting the second text 304, the categorization engine 138 identifies, using an OCR model 352, textual characters from the frames portion 314. The categorization engine 138 further generates, from the identified textual characters and based on the second timing information 305 and the spatial information 306 associated with the second text 304, a sequence of words corresponding to the second text 304.

At block 1410, the categorization engine 138 determines, based at least in part on the frames portion 314, second timing information 305 and spatial information 306 associated with the second text 304. In embodiments, the spatial information 306 associated with the second text 304 from the frames portion 314 includes at least one of a size or a pixel coordinate of each of one or more textual characters, and the second timing information 305 associated with the second text 304 includes a start time of each of the one or more textual characters based on a respective pixel coordinate.

At block 1412, the categorization engine 138 determines, based on a correlation of the first timing information 303 to the second timing information 305, that the first text 302 from the audio portion 312 corresponds to the second text 304 from the frames portion 314.

At block 1414, the categorization engine 138 determines one or more categories 802 of the content item 112 using one or more LLMs 820 to generate, using the first text 302 and the second text 304, a response to one or more questions 822 associated with the one or more categories 802. In embodiments, the one or more categories 802 of the content item 112 includes at least one of politics, healthcare, pharmaceutical, CBD, alcohol, adult content, gun, or gambling.

At block 1416, a rules engine 140 stored in the non-transitory memory of the computer system 130 and executable by the processor of the computer system 130 applies rules 1012 that are based on the determined one or more categories 802 to at least one of the first timing information 303 associated with the first text 302 or the second timing information 305 and the spatial information 306 associated with the second text 304 to determine whether the rules 1012 are satisfied.

In embodiments, as part of applying the rules 1012, the rules engine 140 identifies a specific message 1006 within the first text 302 extracted from the audio portion 312 using at least one LLM 1040 to generate, using the first text 302, a response or answer 1044 to one or more questions 1042 associated with the specific message 1006. The rules engine 140 further determines, based on the first timing information 303, at least one of a start time, an end time, a duration, or a speech rate associated with the specific message 1006. The rules engine 140 further determines whether the at least one of the start time, the end time, the duration, or the speech rate associated with the specific message 1006 satisfies one or more of the rules 1012 (e.g., an earliest start time, a latest end time, a threshold duration).

In embodiments, as part of applying the rules 1012, the rules engine 140 identifies a specific message 1006 within the second text 304 extracted from the frames portion 314 using at least one LLM 1040 to generate, using the second text 304, a response or answer 1044 to one or more questions 1042 associated with the specific message 1006. The rules engine 140 further determines, based on the spatial information 306 associated with the second text 304, a size of an individual textual character in the specific message 1006 with respect to a size of an individual frame 410 of the set of frames 410. The rules engine 140 further determines whether the size of the individual textual character in the specific message 1006 satisfies one or more of the rules (e.g., a threshold percentage size).

At block 1418, a presentation component 146 stored in the non-transitory memory of the computer system 130 and executable by the processor of the computer system 130, outputs, based on whether the rules 1012 are satisfied, an indication of at least one of an acceptance of the content item 112, a rejection of the content item 112, or a reason of the rejection, for example, as discussed above with reference to FIG. 13.

In embodiments, the categorization engine 138 further calculates the size of an individual textual character of the one or more textual characters as a percentage of a frame size of an individual frame 410 of the set of frames 410.

In embodiments, the determining the first timing information 303 associated with the first text 302 at block 1406 is further based on a correlation of a timeline 402 of the audio portion 312 to a timeline 404 of the frames portion 314 and a video timeline 406 of the content item 112-1.

In embodiments, the determining the second timing information 305 associated with the second text 304 is further based on a correlation of a timeline 404 of the frames portion 314 to a timeline 402 of the audio portion 312 and a video timeline 406 of the content item 112-1.

In embodiments, the categorization engine 138 further identifies, using an object detection model 362, an object 307 in at least one frame 410 of the set of frames 410. The categorization engine further determines, based at least in part on the frames portion 314, third timing information 308 and spatial information 309 associated with the object 307, where one or more of the rules 1012 are further applied to the third timing information 308 and spatial information 309 associated with the object 307.

In embodiments, the categorization engine 138 further identifies, using an object detection model 362, an object 307 in at least one frame 410 of the set of frames 410. The categorization engine 138 further determines a subject matter of the content item 112 based on the first text 302 extracted from the audio portion 312. The categorization engine 138 further determines contextual information 812 associated with the content item 112 based on the subject matter and at least one of a frequency of appearance of the object 307 or a frequency of appearance of the second text 304 in the frames portion 314, where the determining the one or more categories 802 of the content item 112 at block 1414 is further based on the contextual information 812.

In an embodiment, the content item 112 may be scheduled for streaming in a next available slot, for example, by a streaming service (e.g., the content delivery system 110) that uses opportunistic scheduling. If the indication output by the presentation component 146 indicates an acceptance of the content item 112, the streaming service may proceed to insert the content item 112 into the next available slot for streaming. If, however, the indication output by the presentation component 146 indicates a rejection of the content item 112, the streaming service may not insert the content item 112 into the next available slot.

Figure 15:
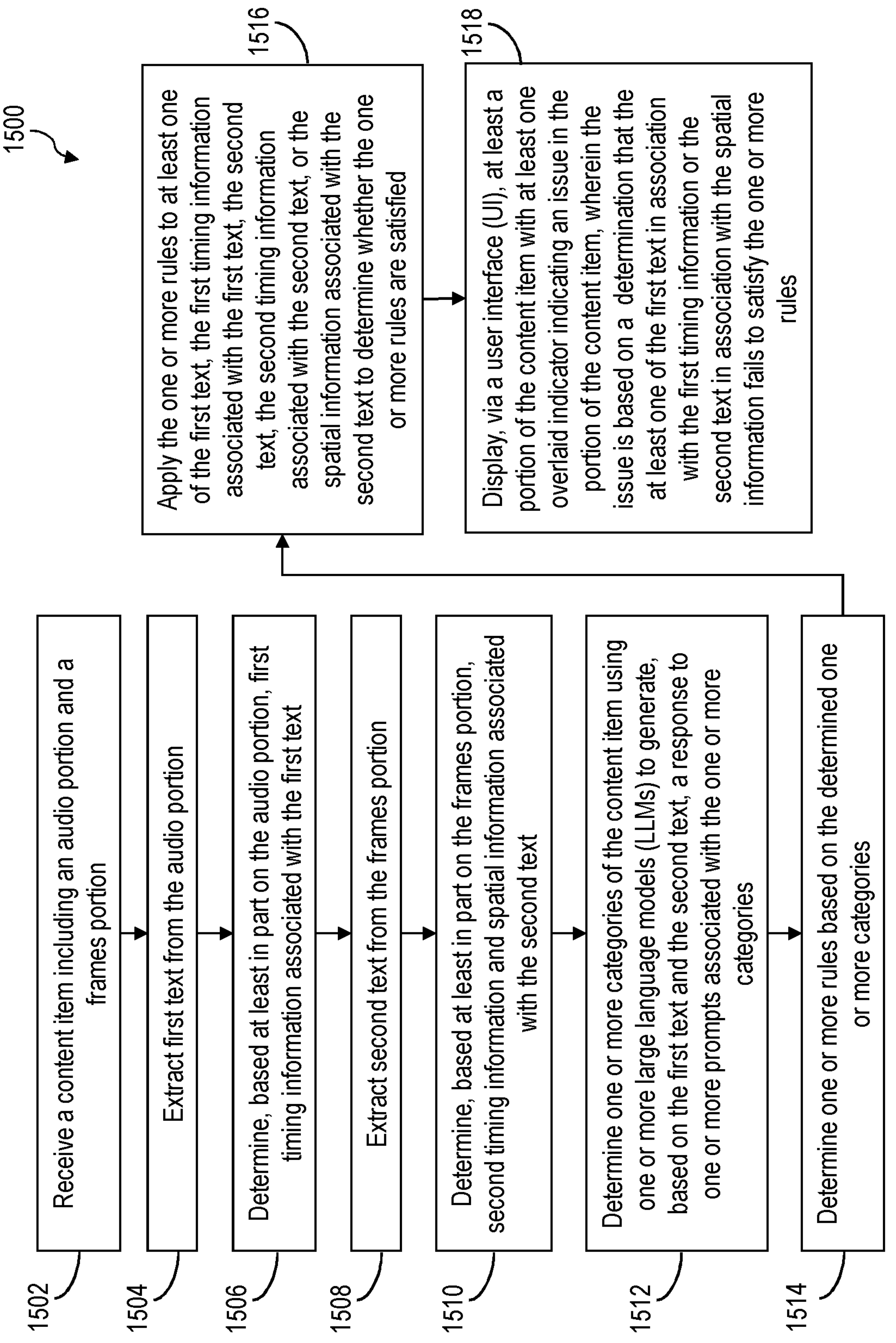
FIG. 15 is a flow chart of a content check method according to an embodiment of the disclosure.

Turning now to FIG. 15, a content check method 1500 is described. The method 1500 may use similar mechanisms as discussed above with reference to FIGS. 1-14. At block 1502, a categorization engine 138 stored in non-transitory memory of a computer system 130 and executable by a processor of the computer system 130 receives a content item 112 including an audio portion 312 and a frames portion 314.

At block 1504, the categorization engine 138 extracts first text 302 from the audio portion 312 of the content item 112.

At block 1506, the categorization engine 138 determines, based at least in part on the audio portion 312, first timing information 303 associated with the first text 302.

At block 1508, the categorization engine 138 extracts second text 304 from the frames portion 314.

At block 1510, the categorization engine 138 determines, based at least in part on the frames portion 314, second timing information 305 and spatial information 306 associated with the second text 304. In an embodiment, as part of determining the one or more categories 802, a first LLM 820 of the one or more LLMs 820 generates, based on at least one of the first text 302 extracted from the audio portion 312 or the second text 304 extracted from the frames portion 314, a first response or answer 824 to a first prompt or question 822. Subsequently, a second LLM 820 of the one or more LLMs 820, based on the at least one of the first text 302 or the second text 304, a second response or answer 824 to a second prompt or question 822 that is based on the first response or answer 824. In some embodiments, the first LLM 820 and the second LLM 820 may correspond to the same LLM. In other embodiments, the first LLM 820 and the second LLM 820 may correspond to the different LLM.

At block 1512, the categorization engine 138 determines one or more categories 802 of the content item 112 using one or more LLMs 820 to generate, using the first text 302 and the second text 304, a response to one or more questions 822 associated with the one or more categories 802. In embodiments, the categorization engine 138 further determines a series of prompts or questions 822 based on a plurality of specific categories 802, where the series of prompts or questions 822 include the one or more prompts or questions 822.

At block 1514, a rules engine 140 stored in the non-transitory memory of the computer system 130 and executable by the processor of the computer system 130 determines one or more rules 1012 based on the determined one or more categories 802. In embodiments, the determining the one or more rules 1012 is further based on at least one of a customer policy.

At block 1516, the rules engine 140 applies one or more rules 1012 to at least one of the first text 302, the first timing information 303 associated with the first text 302, the second text 304, the second timing information 305 associated with the second text 304, or the spatial information 306 associated with the second text 304 to determine whether the rules 1012 are satisfied.

At block 1518, the computer system 130 displays, via a UI 132 of the computer system 130, at least a portion of the content item 112 with at least one overlaid indicator 1110 indicating an issue in the portion of the content item 112, where the issue is based on a determination that the at least one of the first text 302 in association with the first timing information 303 or the second text 304 in association with the spatial information 306 fails to satisfy one or more of the rules 1012, for example, as discussed above with reference to FIG. 11.

Figure 16:
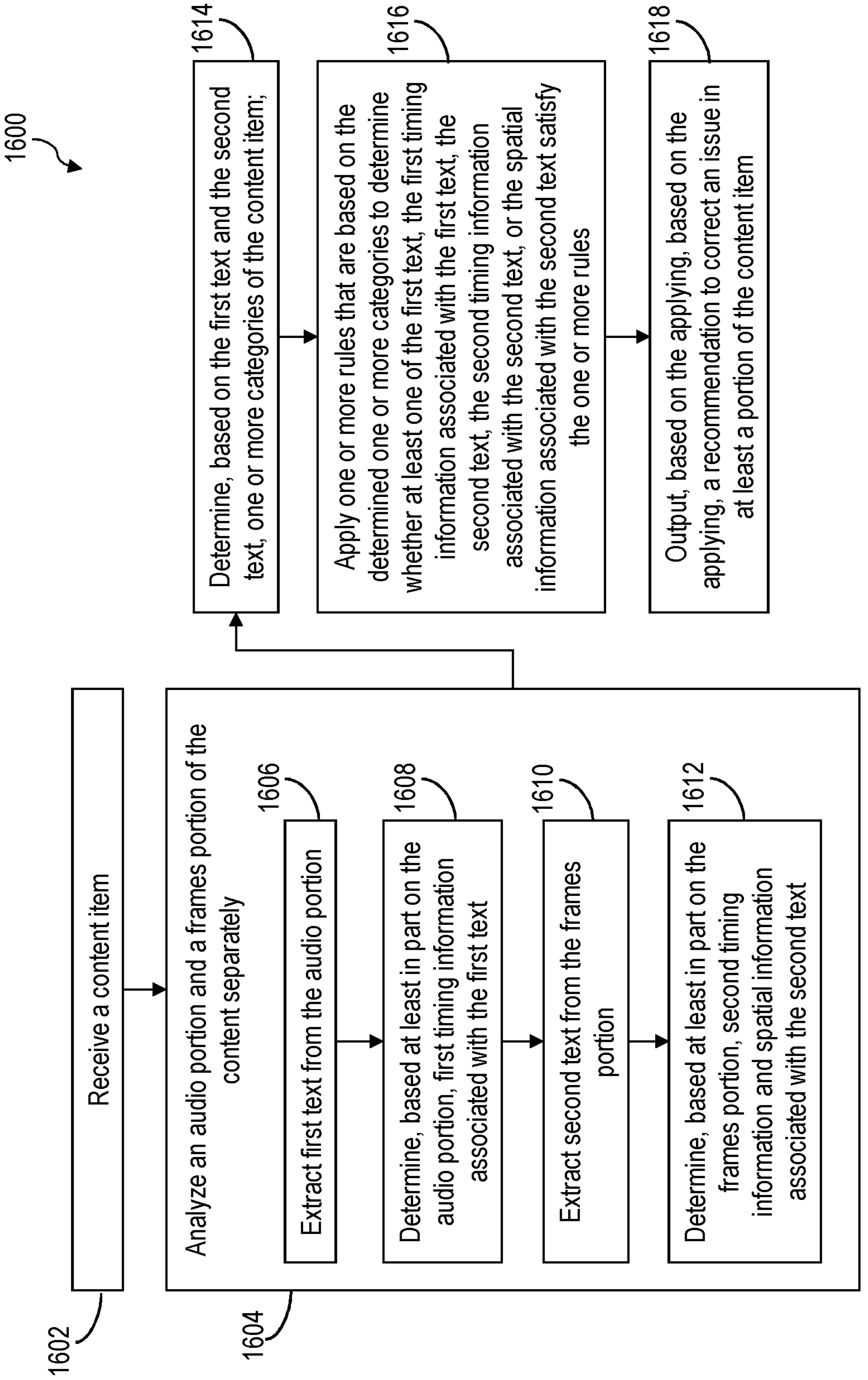
FIG. 16 is a flow chart of a content check method according to an embodiment of the disclosure.

Turning now to FIG. 16, a content check method 1600 is described. The method 1600 may use similar mechanisms as discussed above with reference to FIGS. 1-15. At block 1602, a categorization engine 138 stored in non-transitory memory of a computer system 130 and executable by a processor of the computer system 130, receives a content item 112.

At block 1604, the categorization engine 138 analyzes an audio portion 312 and a frames portion 314 separately. As part of the analyzing, the categorization engine 138 extracts first text 302 from the audio portion 312 at block 1606. The categorization engine 138 determines, based at least in part on the audio portion 312, first timing information 303 associated with the first text 302 at block 1608. The categorization engine 138 further extracts second text 304 from the frames portion 314 at block 1610. The categorization engine 138 determines, based at least in part on the frames portion 314, second timing information 305 and spatial information 306 associated with the second text 304 at block 1612.

At block 1614, the categorization engine 138 determines one or more categories 802 of the content item 112.

At block 1616, a rules engine 140 stored in the non-transitory memory of the computer system 130 and executable by the processor of the computer system 130 applies one or more rules 1012 that are based on the determined one or more categories 802 to determine whether at least one of the first text 302, the first timing information 303 associated with the first text 302, the second text 304, the second timing information 305 associated with the second text 304, or the spatial information 306 associated with the second text 304 satisfy the one or more rules 1012.

At block 1618, a presentation component 146 stored in the non-transitory memory of the computer system 130 and executable by the processor of the computer system 130, based on the applying, outputs a recommendation to correct an issue in at least a portion of the content item 112-1, for example, as discussed above with reference to FIG. 12.

In embodiments, the categorization engine 138 further generates, based on the analyzing at block 1604, metadata 142. The metadata 142 includes the first timing information 303 including, for each of one or more words in the first text 302, at least one of a start time or a stop time of the respective word with respect to at least one of an audio timeline 402, a frame timeline 404, or a video timeline 406 of the content item 112-1. The metadata 142 further includes the second timing information 305 including, for each of one or more text textual characters in the second text 304, at least one of a start time or a stop time of the respective textual character with respect to at least one of the frame timeline 404, the audio timeline 402, or the video timeline 406. The metadata 142 further includes the spatial information 306 including, for each of one of more textual characters in the second text 304, one or more pixel coordinates bounding the respective textual character with respect to a frame coordinate system 602 of a frame 410 in the frames portion 314 and a size of the respective textual character. The metadata 142 further includes the first text 302 in association with the first timing information 303. The metadata 142 further includes the second text 304 in association with the second timing information 305 and the spatial information 306.

In embodiments, a base level analyzer 136 stored in the non-transitory memory of the computer system 130 and executable by the processor of the computer system 130, determines, based on the content item 112-1, content information 230 including at least one of a content asset length, an audio bit rate, a frame rate, a video bit rate, a video width, a video length, or an aspect ratio, where the analyzing the audio portion 312 and the frames portion 314 at block 1604 is further based on the content information 230.

FIG. 17 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the context of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

ADDITIONAL EMBODIMENTS

The following are non-limiting, specific embodiments in accordance with the present disclosure.

A first embodiment which is a content check method comprising extracting, by a categorization engine stored in non-transitory memory of a computer system and executable by a processor of the computer system, an audio portion and a frames portion from a content item, wherein the frames portion comprises a set of frames; extracting, by the categorization engine, first text from the audio portion; determining, by the categorization engine, based at least in part on the audio portion, first timing information associated with the first text; extracting, by the categorization engine, second text from the frames portion; determining, by the categorization engine, based at least in part on the frames portion, second timing information and spatial information associated with the second text; determining, by the categorization engine, based on a correlation of the first timing information to the second timing information, that the first text from the audio portion corresponds to the second text from the frames portion; determining, by the categorization engine, one or more categories of the content item using one or more large language models (LLMs) to generate, using the first text and the second text, a response to one or more questions associated with the one or more categories; applying, by a rules engine stored in the non-transitory memory of the computer system and executable by the processor of the computer system, rules that are based on the determined one or more categories to at least one of the first timing information associated with the first text or the second timing information and the spatial information associated with the second text to determine whether the rules are satisfied; and outputting, by a presentation component stored in the non-transitory memory of the computer system and executable by the processor of the computer system, based on whether the rules are satisfied, an indication of at least one of an acceptance of the content item, a rejection of the content item, or a reason of the rejection.

A second embodiment, which is the content check method of the first embodiment, wherein the first timing information associated with the first text from the audio portion comprises at least one of a start time, an end time, or a duration of each of one or more words in the first text.

A third embodiment, which is the content check method of the first embodiment, wherein the spatial information associated with the second text from the frames portion comprises at least one of a size or a pixel coordinate of each of one or more textual characters, and wherein the second timing information associated with the second text comprises a start time of each of the one or more textual characters based on a respective pixel coordinate.

A fourth embodiment, which is the content check method of the first embodiment, further comprising calculating, by the categorization engine, the size of an individual textual character of the one or more textual characters as a percentage of a frame size of an individual frame of the set of frames.

A fifth embodiment, which is the content check method of the first embodiment, wherein the extracting the first text from the audio portion comprises detecting, by the categorization engine, using a speech recognition model, speech from the audio portion; and converting, by the categorization engine, using a speech-to-text model, the detected speech into the first text.

A sixth embodiment, which is the content check method of the first embodiment, wherein the extracting the second text from the frames portion comprises identifying, by the categorization engine, using an optical character recognition (OCR) model, textual characters from the frames portion; and generating, by the categorization engine, from the identified textual characters and based on the second timing information and the spatial information associated with the second text, a sequence of words corresponding to the second text.

A seventh embodiment, which is the content check method of the first embodiment, wherein the determining the first timing information associated with the first text is further based on a correlation of a timeline of the audio portion to a timeline of the frames portion and a video timeline of the content item.

An eighth embodiment, which is the content check method of the first embodiment, wherein the determining the second timing information associated with the second text is further based on a correlation of a timeline of the frames portion to a timeline of the audio portion and a video timeline of the content item.

A ninth embodiment, which is the content check method of the first embodiment, wherein the one or more categories of the content item comprises at least one of politics, healthcare, pharmaceutical, cannabidiol (CBD), alcohol, adult content, gun, or gambling.

A tenth embodiment, which is the content check method of the first embodiment, further comprising identifying, by the categorization engine, using an object detection model, an object in at least one frame of the set of frames; and determining, by the categorization engine, based at least in part on the frames portion, third timing information and spatial information associated with the object, wherein one or more of the rules are further applied to the third timing information and spatial information associated with the object.

An eleventh embodiment, which is the content check method of the first embodiment, further comprising identifying, by the categorization engine, using an object detection model, an object in at least one frame of the set of frames; determining, by the categorization engine, a subject matter of the content item based on the first text extracted from the audio portion; and determining, by the categorization engine, contextual information associated with the content item based on the subject matter and at least one of a frequency of appearance of the object or a frequency of appearance of the second text in the frames portion, wherein the determining the one or more categories of the content item is further based on the contextual information.

A twelfth embodiment, which is the content check method of the first embodiment, wherein the applying the rules comprises identifying, by the rules engine, a specific message within the first text extracted from the audio portion using at least one LLM to generate, using the first text, a response to one or more questions associated with the specific message; determining, by the rules engine, based on the first timing information, at least one of a start time, an end time, a duration, or a speech rate associated with the specific message; and determining whether the at least one of the start time, the end time, the duration, or the speech rate associated with the specific message satisfies one or more of the rules.

A thirteenth embodiment, which is the content check method of the first embodiment, wherein the applying the rules comprises identifying, by the rules engine, a specific message within the second text extracted from the frames portion using at least one LLM to generate, using the second text, a response to one or more questions associated with the specific message; determining, by the rules engine, based on the spatial information associated with the second text, a size of an individual textual character in the specific message with respect to a size of an individual frame of the set of frames; and determining whether the size of the individual textual character in the specific message satisfies one or more of the rules.

A fourteenth embodiment, which is a content check method comprising receiving, by a categorization engine stored in non-transitory memory of a computer system and executable by a processor of the computer system, a content item comprising an audio portion and a frames portion; extracting, by the categorization engine, first text from an audio portion of the content item; determining, by the categorization engine, based at least in part on the audio portion, first timing information associated with the first text; extracting, by the categorization engine, second text from a frames portion of the content item; determining, by the categorization engine, based at least in part on the frames portion, second timing information and spatial information associated with the second text; determining, by the categorization engine, one or more categories of the content item using one or more large language models (LLMs) to generate, based on the first text and the second text, a response to one or more prompts associated with the one or more categories; determining, by a rules engine stored in the non-transitory memory of the computer system and executable by the processor of the computer system, one or more rules based on the determined one or more categories; applying, by the rules engine, the one or more rules to at least one of the first text, the first timing information associated with the first text, the second text, the second timing information associated with the second text, or the spatial information associated with the second text to determine whether the rules are satisfied; and displaying, via a user interface (UI) of the computer system, at least a portion of the content item with at least one overlaid indicator indicating an issue in the portion of the content item, wherein the issue is based on a determination that the at least one of the first text in association with the first timing information or the second text in association with the spatial information fails to satisfy one or more of the rules.

A fifteenth embodiment, which is the content check method of the fourteenth embodiment, wherein the determining the one or more rules is further based on at least one of a customer policy.

A sixteenth embodiment, which is the content check method of the fourteenth embodiment, wherein the determining the one or more categories of the content item comprises generating, by a first LLM of the one or more LLMs, based on at least one of the first text extracted from the audio portion or the second text extracted from the frames portion, a first response to a first prompt; and generating, by a second LLM of the one or more LLMs, based on the at least one of the first text or the second text, a second response to a second prompt that is based on the first response.

A seventeenth embodiment, which is the content check method of the fourteenth embodiment, further comprising determining, by the categorization engine, a series of prompts based on a plurality of specific categories, wherein the series of prompts comprise the one or more prompts.

An eighteenth embodiment, which is a content check method comprising receiving, by a categorization engine stored in non-transitory memory of a computer system and executable by a processor of the computer system, a content item; analyzing, by the categorization engine, an audio portion and a frames portion separately, wherein the analyzing comprises extracting, by the categorization engine, first text from the audio portion; determining, by the categorization engine, based at least in part on the audio portion, first timing information associated with the first text in metadata; extracting, by the categorization engine, second text from the frames portion; determining, by the categorization engine, based at least in part on the frames portion, second timing information and spatial information associated with the second text; determining, by the categorization engine, based on the first text and the second text, one or more categories of the content item; applying, by a rules engine stored in the non-transitory memory of the computer system and executable by the processor of the computer system, one or more rules that are based on the determined one or more categories to determine whether at least one of the first text, the first timing information associated with the first text, the second text, the second timing information associated with the second text, or the spatial information associated with the second text satisfy the one or more rules; and outputting, by a presentation component stored in the non-transitory memory of the computer system and executable by the processor of the computer system, based on the applying, a recommendation to correct an issue in at least a portion of the content item.

A nineteenth embodiment, which is the content check method of the eighteenth embodiment, further comprising generating, by the categorization engine, based on the analyzing, metadata comprising the first timing information comprising, for each of one or more words in the first text, at least one of a start time or a stop time of the respective word with respect to at least one of an audio timeline, a frame timeline, or a video timeline of the content item; the second timing information comprising, for each of one or more text textual characters in the second text, at least one of a start time or a stop time of the respective textual character with respect to at least one of the frame timeline, the audio timeline, or the video timeline; the spatial information comprising, for each of one of more textual characters in the second text, one or more pixel coordinates bounding the respective textual character with respect to a frame coordinate system of a frame in the frames portion and a size of the respective textual character; the first text in association with the first timing information; and the second text in association with the second timing information and the spatial information.

A twentieth embodiment, which is the content check method of the eighteenth embodiment, further comprising determining, by a base level analyzer stored in the non-transitory memory of the computer system and executable by the processor of the computer system, based on the content item, content information comprising at least one of a content asset length, an audio bit rate, a frame rate, a video bit rate, a video width, a video length, or an aspect ratio, wherein the analyzing the audio portion and the frames portion is further based on the content information.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A computer-implemented method for analyzing individual components of video content separately and correlating the separate analysis to provide timely content compliance checks against rules, the method comprising:
  - receiving, by a categorization engine stored in non-transitory memory of a computer system and executable by a processor of the computer system, a content item for presentation in a next available slot that is based on opportunistic scheduling;
  - extracting, by the categorization engine, an audio component and a frames component from the content item, wherein the frames component comprises a set of frames;
  - analyzing, by the categorization engine, the audio component and the frames component separately by:
    - extracting, by the categorization engine, first text from the audio component;
    - determining, by the categorization engine, based at least in part on the audio component, first timing information associated with the first text;
    - extracting, by the categorization engine, second text from the frames component; and
    - determining, by the categorization engine, based at least in part on the frames component, second timing information and spatial information associated with the second text;
  - determining, by the categorization engine, based on a correlation of the first timing information to the second timing information, a temporal relationship between the first text from the audio component and the second text from the frames component;
  - determining, by the categorization engine, one or more categories of the content item using one or more large language models (LLMs) to generate, using the first text and the second text, a response to one or more questions associated with the one or more categories, wherein the first text and the second text are provided as separate inputs to the one or more LLMs, the first text derived from the separate analysis of the audio component and the second text derived from the separate analysis of the frames component;

applying, by a rules engine stored in the non-transitory memory of the computer system and executable by the processor of the computer system, rules that are based on the determined one or more categories to at least one of the first timing information associated with the first text or the second timing information and the spatial information associated with the second text to determine whether the rules are satisfied, wherein the applying comprises:

determining whether the temporal relationship between the first text from the audio component and the second text from the frames component satisfies a temporal relationship requirement between audio text and visual text specified by a first rule of the rules;

determining whether the second timing information of the second text satisfies a visual text timing requirement specified by a second rule of the rules; and determining whether the spatial information of the second text satisfies a visual text sizing and location requirement specified by a third rule of the rules; and inserting a different content item in the next available slot rather than the content item in response to determining at least one of the temporal relationship between the first text from the audio component and the second text from the frames component fails to satisfy the temporal relationship requirement specified by the first rule, the second timing information of the second text fails to satisfy the visual text timing requirement specified by the second rule, or the spatial information of the second text fails to satisfy the visual text sizing and location requirement specified in the third rule.

2. The method of claim 1, wherein the first timing information associated with the first text from the audio component comprises at least one of a start time, an end time, or a duration of each of one or more words in the first text.

3. The method of claim 1, wherein the spatial information associated with the second text from the frames component comprises at least one of a size or a pixel coordinate of each of one or more textual characters, and wherein the second timing information associated with the second text comprises a start time of each of the one or more textual characters based on a respective pixel coordinate.

4. The method of claim 3, further comprising:

calculating, by the categorization engine, the size of an individual textual character of the one or more textual characters as a percentage of a frame size of an individual frame of the set of frames.

5. The method of claim 1, wherein the extracting the first text from the audio component comprises:

detecting, by the categorization engine, using a speech recognition model, speech from the audio component; and converting, by the categorization engine, using a speech-to-text model, the detected speech into the first text.

6. The method of claim 1, wherein the extracting the second text from the frames component comprises:

identifying, by the categorization engine, using an optical character recognition (OCR) model, textual characters from the frames component; and generating, by the categorization engine, from the identified textual characters and based on the second timing information and the spatial information associated with the second text, a sequence of words corresponding to the second text.

7. The method of claim 1, wherein:

the determining the first timing information associated with the first text is further based on a correlation of a timeline of the audio component to a timeline of the frames component and a video timeline of the content item, the determining the second timing information associated with the second text is further based on a correlation of the timeline of the frames component to the timeline of the audio component and the video timeline of the content item, and the determining the temporal relationship between the first text from the audio component and the second text from the frames component is further based on a timing of the first text from the audio component with respect to the video timeline and a timing of the second text from the frames component with respect to the video timeline.

8. The method of claim 7, further comprising:

correlating, by the categorization engine, the timeline of the frames component to the video timeline based on a first frame rate associated with the frames component and a second frame rate associated with a rendering of the content item, wherein the first frame rate is different than the second frame rate.

9. The method of claim 1, wherein the one or more categories of the content item comprises at least one of politics, healthcare, pharmaceutical, cannabidiol (CBD), alcohol, adult content, gun, or gambling.

10. The method of claim 1, further comprising:

identifying, by the categorization engine, using an object detection model, an object in at least one frame of the set of frames; and determining, by the categorization engine, based at least in part on the frames component, third timing information and the spatial information associated with the object, wherein the applying the rules further comprises:

determining whether the third timing information of the object satisfies a visual object timing requirement specified by a fourth rule of the rules; and determining whether the spatial information of the object satisfies a visual object sizing and location requirement specified by a fifth rule of the rules.

11. The method of claim 1, wherein the applying the rules comprises:

determining, by the rules engine, that the first text extracted from the audio component includes a specific message satisfying a message requirement specified by a fourth rule of the rules, using at least one LLM to generate, using the first text, a response to one or more questions associated with the specific message.

12. The method of claim 1, wherein:

the applying the rules comprises:

determining, by the rules engine, that the second text extracted from the frames component includes a specific message satisfying a message requirement specified by a fourth rule of the rules, using at least one LLM to generate, using the second text, a response to one or more questions associated with the specific message, the determining whether the second timing information of the second text satisfies the visual text timing requirement comprises:

determining, by the rules engine, based on the second timing information, at least one of a start time, an end time, or a duration associated with the specific message; and determining, by the rules engine, whether the at least one of the start time, the end time, or the duration with the specific message satisfies the visual text timing requirement, and the determining whether the spatial information of the second text satisfies the visual text sizing and location requirement comprises:

determining, by the rules engine, based on the spatial information associated with the second text, a size of an individual textual character in the specific message with respect to a size of an individual frame of the set of frames and a location of the individual textual character with respect to the individual frame; and determining whether the size and the location of the individual textual character in the specific message satisfies the visual text sizing and location requirement.

13. The method of claim 1, wherein the determining the first timing information is based on a correlation of a timeline of the audio component, a timeline of the frames component, and a video timeline of the content item, and wherein the determining the second timing information is based on a correlation of the timeline of the frames component, the timeline of the audio component, and the video timeline of the content item.

14. A computer-implemented method for analyzing individual portions of media content to provide content categorization and content compliance checks against rules depending on the content categorization, the method comprising:

extracting, by a categorization engine stored in non-transitory memory of a computer system and executable by a processor of the computer system, an audio portion and a frames portion from a content item;

extracting, by the categorization engine, first text from the audio portion of the content item;

determining, by the categorization engine, based at least in part on the audio portion, first timing information associated with the first text;

extracting, by the categorization engine, at least one of second text or an object from the frames portion of the content item;

determining, by the categorization engine, based at least in part on the frames portion, second timing information and spatial information associated with the at least one of the second text or the object;

determining, by the categorization engine, one or more categories of the content item using one or more large language models (LLMs) to generate, based on the first text and the at least one of the second text or the object, a response to one or more prompts associated with the one or more categories, wherein the first text and the at least one of the second text or the object are provided as separate inputs to the one or more LLMs, the first text derived from an independent analysis of the audio portion and the at least one of the second text or the object derived from an independent analysis of the frames portion;

determining, by a rules engine stored in the non-transitory memory of the computer system and executable by the processor of the computer system, one or more rules based on the determined one or more categories;

applying, by the rules engine, the one or more rules to at least one of the first timing information associated with the first text, the second timing information associated with the at least one of the second text or the object, or the spatial information associated with the at least one of the second text or the object to determine whether the rules are satisfied; and displaying, via a user interface (UI) of the computer system, at least a portion of the content item with at least one indicator indicating an issue in the portion of the content item, wherein the issue is based on a determination that the at least one of the first text in association with the first timing information or the at least one of the second text or the object in association with the spatial information fails to satisfy one or more of the rules.

15. The method of claim 14, wherein:

the extracting the at least one of the second text or the object from the frames portion comprises:

identifying, by the categorization engine, using an object detection model, the object in at least one frame of the frames portion, and the determining the one or more categories of the content item comprises:

determining, by the categorization engine, a subject matter of the content item based on the first text extracted from the audio portion; and determining, by the categorization engine, contextual information associated with the content item based on the subject matter and a frequency of appearance of the at least one of the second text or the object in the frames portion, and the determining the one or more categories of the content item is further based on the contextual information.

16. The method of claim 14, wherein the determining the one or more rules is further based on at least one of a customer policy.

17. The method of claim 14, further comprising:

determining, by the categorization engine, a series of prompts based on a plurality of specific categories, wherein the series of prompts comprise the one or more prompts.

18. The method of claim 14, wherein the displaying further comprises displaying, via the UI, a recommendation to correct the issue in the portion of the content item.

19. A computer-implemented method for analyzing individual portions of media content to provide content compliance checks against rules, the method comprising:

receiving, by a categorization engine stored in non-transitory memory of a computer system and executable by a processor of the computer system, a content item;

analyzing, by the categorization engine, an audio portion and a frames portion of the content item separately, wherein the analyzing comprises:

extracting, by the categorization engine, first text from the audio portion;

determining, by the categorization engine, based at least in part on the audio portion, first timing information associated with the first text in metadata;

extracting, by the categorization engine, second text from the frames portion; and determining, by the categorization engine, based at least in part on the frames portion, second timing information and spatial information associated with the second text;

determining, by the categorization engine, based on the first text and the second text, one or more categories of the content item using one or more large language models (LLMs) to generate, based on the first text and the second text, a response to one or more prompts associated with the one or more categories, wherein the first text and the second text are provided as separate inputs to the one or more LLMs, the first text derived from the separate analysis of the audio portion and the second text derived from the separate analysis of the frames portion;

applying, by a rules engine stored in the non-transitory memory of the computer system and executable by the processor of the computer system, one or more rules that are based on the determined one or more categories to determine whether at least one of the first text, the first timing information associated with the first text, the second text, the second timing information associated with the second text, or the spatial information associated with the second text satisfy the one or more rules; and outputting, by a presentation component stored in the non-transitory memory of the computer system and executable by the processor of the computer system, based on the applying, an indication of whether there is an issue in at least a portion of the content item.

20. The method of claim 19, further comprising:

modifying, by an action component stored in the non-transitory memory of the computer system and executable by the processor of the computer system, based on the indication, the at least the portion of the content item.

21. The method of claim 19, further comprising:

providing, by an action component stored in the non-transitory memory of the computer system and executable by the processor of the computer system, based on the indication, the content item for streaming.

* * * * *